US012462886B2

(12) United States Patent
Li et al.

(10) Patent No.: US 12,462,886 B2
(45) Date of Patent: *Nov. 4, 2025

(54) METHOD FOR PROGRAMMING A MEMORY DEVICE TO REDUCE RETENTION ERROR

(71) Applicant: YANGTZE MEMORY TECHNOLOGIES CO., LTD., Wuhan (CN)

(72) Inventors: Haibo Li, Wuhan (CN); Man Lung Mui, Wuhan (CN); Yu Wang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 192 days.

This patent is subject to a terminal disclaimer.

(21) Appl. No.: 18/225,575

(22) Filed: Jul. 24, 2023

(65) Prior Publication Data
US 2024/0006004 A1 Jan. 4, 2024

Related U.S. Application Data

(63) Continuation-in-part of application No. 17/318,992, filed on May 12, 2021, now Pat. No. 12,033,708, (Continued)

(51) Int. Cl.
*G11C 16/34* (2006.01)
*G11C 16/08* (2006.01)

(52) U.S. Cl.
CPC .......... *G11C 16/3486* (2013.01); *G11C 16/08* (2013.01); *G11C 16/3459* (2013.01)

(58) Field of Classification Search
CPC .. G11C 16/3459; G11C 16/08; G11C 16/3486
(Continued)

(56) References Cited

U.S. PATENT DOCUMENTS 7,548,462 B2 6/2009 Hung
8,208,310 B2 6/2012 Dong
(Continued)

FOREIGN PATENT DOCUMENTS

CN 101335048 A 12/2008
CN 102754165 A 10/2012
(Continued)

*Primary Examiner* — Sung Il Cho
(74) *Attorney, Agent, or Firm* — BAYES PLLC

(57) ABSTRACT

In certain aspects, a memory device includes a plurality of memory cells and a control circuit coupled to the plurality of memory cells. The plurality of memory cells includes a first set of memory cells configured to be programmed into a first set of programming states each of which is not lower than a first predetermined programming state. The control circuit is configured to perform a first program pass on the first set of memory cells. The control circuit is configured to continue to program at least a first memory cell from the first set of memory cells with one or more first programming voltages. A threshold voltage of the first memory cell is greater than a first verification voltage that corresponds to a first programming state of the first memory cell. The control circuit is configured to perform a second program pass on the first set of memory cells.

21 Claims, 28 Drawing Sheets

Related U.S. Application Data which is a continuation of application No. 16/371,130, filed on Apr. 1, 2019, now Pat. No. 11,037,642, which is a continuation of application No. PCT/CN2019/075549, filed on Feb. 20, 2019.

(58) Field of Classification Search
USPC .................................................. 365/185.22
See application file for complete search history.

(56) References Cited

U.S. PATENT DOCUMENTS

| | | |
|---|---|---|
| 8,248,850 B2 | 8/2012 | Dutta |
| 9,449,695 B2 | 9/2016 | Kim |
| 2007/0014163 A1 | 1/2007 | Kim |
| 2009/0287975 A1 | 11/2009 | Kim et al. |
| 2010/0002523 A1 | 1/2010 | Park |
| 2010/0284219 A1 | 11/2010 | Kim et al. |
| 2011/0194346 A1 | 8/2011 | Yoon |
| 2012/0140566 A1 | 6/2012 | Aritome |
| 2013/0336057 A1* | 12/2013 | Chung ............... G11C 16/3459 365/185.03 |
| 2014/0153329 A1 | 6/2014 | Kang et al. |
| 2014/0219027 A1 | 8/2014 | Dong |
| 2014/0376310 A1* | 12/2014 | Kim ................... G11C 16/3427 365/185.02 |
| 2015/0078093 A1 | 3/2015 | Hahn et al. |
| 2015/0348633 A1 | 12/2015 | Song et al. |
| 2016/0071581 A1 | 3/2016 | Lee |
| 2016/0118126 A1 | 4/2016 | Moon |
| 2016/0372185 A1 | 12/2016 | Shim et al. |
| 2017/0148520 A1 | 5/2017 | Oh |
| 2017/0154677 A1 | 6/2017 | Lim et al. |
| 2018/0068727 A1* | 3/2018 | Harada ................... G11C 16/10 |
| 2018/0075909 A1* | 3/2018 | Lee ..................... G11C 16/3459 |
| 2020/0027512 A1* | 1/2020 | Yun ........................ G11C 16/14 |

FOREIGN PATENT DOCUMENTS

| | | |
|---|---|---|
| CN | 102947888 A | 2/2013 |
| CN | 105097034 A | 11/2015 |
| CN | 107633865 A | 1/2018 |
| CN | 107689245 A | 2/2018 |
| KR | 20120016233 A | 2/2012 |
| KR | 20160150501 A | 12/2016 |
| KR | 20170059643 A | 5/2017 |

* cited by examiner

TABLE 2

| | | | Start P2 Verify | | Start P3 Verify | | Start P4 Verify | | Start P5 Verify | |
|---|---|---|---|---|---|---|---|---|---|---|
| Program pulse | 1 | 2 | 3 | 4 | 5 | 6 | 7 | 8 | 9 | 10 |
| Program cells | P1~P7 | P1~P7 | P1~P7 | P1~P7 | P1~P7 | P2~P7 | P2~P7 | P3~P7 | P3~P7 | P4~P7 |
| Verification Voltage (Verify level) | P1 | P1 | P1/P2 | P1/P2 | P1/P2/P3 | P2/P3 | P2/P3/P4 | P3/P4 | P3/P4/P5 | P4/P5 |

| | Start P6 Verify | | Start P7 Verify | | | | |
|---|---|---|---|---|---|---|---|
| Program pulse | 11 | 12 | 13 | 14 | 15 | 16 | 17 |
| Program cells | P4~P7 | P5~P7 | P5~P7 | P6~P7 | P6~P7 | P7 | P7 |
| Verification Voltage (Verify level) | P4/P5/P6 | P5/P6 | P5/P6/P7 | P6/P7 | P6/P7 | P7 | P7 |

FIG. 11

METHOD FOR PROGRAMMING A MEMORY DEVICE TO REDUCE RETENTION ERROR

CROSS REFERENCE TO RELATED APPLICATIONS

This application is a continuation-in-part of U.S. application Ser. No. 17/318,992, filed on May 12, 2021, which is a continuation of U.S. application Ser. No. 16/371,130, filed on Apr. 1, 2019, which is a continuation of International Application No. PCT/CN2019/075549, filed on Feb. 20, 2019, all of which are incorporated herein by reference in their entireties.

BACKGROUND

The present disclosure is related to memory devices, memory systems, and operation methods thereof.

A NAND flash memory is a type of non-volatile storage medium that has been widely used in many fields including notebooks, mobile phones, and hard drives. However, the data stored in the NAND flash memory may not always be stable and fixed. For example, as the flash memory cells lose charges over time, the data stored in the flash memory cells may change and become invalid. The retention error in the flash memory would be even more detrimental when the flash memory cells are multiple-level cells (MLC).

One of the reasons that cause the retention error is the instant threshold voltage (Vt) shift (IVS), which means that the threshold voltage raised by the program operation may drop within a short period of time (e.g., within tens of milliseconds) after the program operation. Sometimes, the IVS can be as significant as 200 mV to 300 mV. In this case, the read margin can be reduced, and the data stored in some of the flash memory cells may become invalid.

SUMMARY

In one aspect, a memory device includes a plurality of memory cells and a control circuit coupled to the plurality of memory cells. The plurality of memory cells includes a first set of memory cells configured to be programmed into a first set of programming states each of which is not lower than a first predetermined programming state. The control circuit is configured to perform a first program pass on the first set of memory cells. The control circuit is configured to continue to program at least a first memory cell from the first set of memory cells with one or more first programming voltages. A threshold voltage of the first memory cell is greater than a first verification voltage that corresponds to a first programming state of the first memory cell. The control circuit is configured to perform a second program pass on the first set of memory cells.

In some implementations, to continue to program at least the first memory cell with the one or more first programming voltages, the control circuit is configured to apply the one or more first programming voltages to further program the first memory cell in the first program pass.

In some implementations, the threshold voltage of the first memory cell is smaller than the first verification voltage in a previous program loop of the first program pass, and becomes greater than the first verification voltage in a current program loop of the first program pass. To apply the one or more first programming voltages to further program the first memory cell in the first program pass, the control circuit is configured to apply one or more program pulses in one or more following program loops after the current program loop to further program the first memory cell in the one or more following program loops, respectively.

In some implementations, to continue to program at least the first memory cell from the first set of memory cells with the one or more first programming voltages, the control circuit is configured to reprogram at least the first memory cell in an intermediate program pass between the first program pass and the second program pass performed on the first set of memory cells.

In some implementations, the control circuit is further configured to reprogram at least the first memory cell in the intermediate program pass in response to receiving a reprogramming instruction from a memory controller.

In some implementations, the first set of memory cells is coupled to a word line WL(n), where n is a positive integer. The plurality of memory cells further include a second set of memory cells coupled to a word line WL(n+1), a third set of memory cells coupled to a word line WL(n+2), and a fourth set of memory cells coupled to a word line WL(n−1). The control circuit is further configured to perform the first program pass on the first set of memory cells coupled to the word line WL(n), perform the second program pass on the fourth set of memory cells coupled to the word line WL(n−1), perform the first program pass on the second set of memory cells coupled to the word line WL(n+1), perform the second program pass on the first set of memory cells coupled to the word line WL(n), perform the first program pass on the third set of memory cells coupled to the word line WL(n+2), and perform the second program pass on the second set of memory cells coupled to the word line WL(n+1).

In some implementations, the second set of memory cells is configured to be programmed into a second set of programming states each of which is not lower than the first predetermined programming state. The third set of memory cells is configured to be programmed into a third set of programming states each of which is not lower than the first predetermined programming state. The control circuit is further configured to continue to program at least the first memory cell from the first set of memory cells with the one or more first programming voltages in the first program pass performed on the first set of memory cells coupled to the word line WL(n), continue to program at least a second memory cell from the second set of memory cells with one or more second programming voltages in the first program pass performed on the second set of memory cells coupled to the word line WL(n+1), and continue to program at least a third memory cell from the third set of memory cells with one or more third programming voltages in the first program pass performed on the third set of memory cells coupled to the word line WL(n+2).

In some implementations, the second set of memory cells is configured to be programmed into a second set of programming states each of which is not lower than the first predetermined programming state. The third set of memory cells is configured to be programmed into a third set of programming states each of which is not lower than the first predetermined programming state. The control circuit is further configured to reprogram at least the first memory cell in an intermediate program pass between the first program pass and the second program pass performed on the first set of memory cells coupled to the word line WL(n), reprogram at least a second memory cell from the second set of memory cells in an intermediate program pass between the first program pass and the second program pass performed on the second set of memory cells coupled to the word line WL(n+

1), and reprogram at least a third memory cell from the third set of memory cells in an intermediate program pass between the first program pass and the second program pass performed on the third set of memory cells coupled to the word line WL(n+2).

In some implementations, responsive to programming at least the first memory cell from the first set of memory cells with the one or more first programming voltages, a first width of a first threshold voltage distribution of the first memory cell corresponding to the first programming state is different from a second width of a second threshold voltage distribution of a second memory cell corresponding to a second programming state. The second programming state is lower than the first predetermined programming state.

In some implementations, to continue to program at least the first memory cell with the one or more first programming voltages, the control circuit is configured to determine that a predetermined number of program loops have been performed when the threshold voltage of the first memory cell becomes greater than the first verification voltage. A value for the predetermined number of program loops is determined based on the first predetermined programming state. The control circuit is configured to select the first memory cell from the first set of memory cells to continue to program the first memory cell with the one or more first programming voltages.

In some implementations, to continue to program the at least one first memory cell with the one or more first programming voltages, the control circuit is configured to determine that a programming of a second predetermined programming state has been finished when the threshold voltage of the at least one first memory cell becomes greater than the first verification voltage. The second predetermined programming state is determined based on the first predetermined programming state. The control circuit is configured to select the first memory cell from the first set of memory cells to continue to program the first memory cell with the one or more first programming voltages.

In some implementations, the plurality of memory cells are quad-level cells (QLCs), and the first and second program passes include a coarse program pass and a fine program pass, respectively.

In another aspect, a system includes a memory controller and a memory device coupled to the memory controller. The memory controller is configured to generate and send a reprogramming instruction to the memory device. The memory device is configured to store data. The memory device includes a plurality of memory cells and a control circuit coupled to the plurality of memory cells. The plurality of memory cells include a first set of memory cells configured to be programmed into a first set of programming states each of which is not lower than a first predetermined programming state. The control circuit is configured to perform a first program pass on the first set of memory cells. In response to receiving the reprogramming instruction, the control circuit is configured to reprogram at least a first memory cell from the first set of memory cells. The control circuit is configured to perform a second program pass on the first set of memory cells.

In some implementations, the memory controller is configured to generate and send the reprogramming instruction to the memory device prior to the second program pass performed on the first set of memory cells.

In some implementations, to reprogram at least the first memory cell from the first set of memory cells, the control circuit is configured to reprogram at least the first memory cell in an intermediate program pass prior to the second program pass performed on the first set of memory cells.

In some implementations, the first set of memory cells is coupled to a word line WL(n), where n is a positive integer. The plurality of memory cells further include a second set of memory cells coupled to a word line WL(n+1), a third set of memory cells coupled to a word line WL(n+2), and a fourth set of memory cells coupled to a word line WL(n−1). The control circuit is further configured to perform the first program pass on the first set of memory cells coupled to the word line WL(n), perform the second program pass on the fourth set of memory cells coupled to the word line WL(n−1), perform the first program pass on the second set of memory cells coupled to the word line WL(n+1), perform the second program pass on the first set of memory cells coupled to the word line WL(n), perform the first program pass on the third set of memory cells coupled to the word line WL(n+2), and perform the second program pass on the second set of memory cells coupled to the word line WL(n+1).

In some implementations, the memory controller is configured to generate and send the reprogramming instruction to the memory device in response to one of the following: a completion of the first program pass performed on the first set of memory cells coupled to the word line WL(n), a completion of the second program pass performed on the fourth set of memory cells coupled to the word line WL(n−1), or a completion of the first program pass performed on the second set of memory cells coupled to the word line WL(n+1).

In yet another aspect, a method for operating a memory device is disclosed. The memory device includes a plurality of memory cells, and the plurality of memory cells includes a first set of memory cells configured to be programmed into a first set of programming states each of which is not lower than a first predetermined programming state. The method includes performing a first program pass on the first set of memory cells. The method includes continuing to program at least a first memory cell from the first set of memory cells with one or more first programming voltages, where a threshold voltage of the first memory cell is greater than a first verification voltage that corresponds to a first programming state of the first memory cell. The method includes performing a second program pass on the first set of memory cells.

In still yet another aspect, a method for operating a system including a memory controller and a memory device is disclosed. The method includes generating, by the memory controller, a reprogramming instruction. The method includes sending, by the memory controller, the reprogramming instruction to the memory device, where the memory device includes a first set of memory cells configured to be programmed into a first set of programming states each of which is not lower than a first predetermined programming state. The method includes performing, by the memory device, a first program pass on the first set of memory cells. In response to receiving the reprogramming instruction, the method includes reprogramming, by the memory device, at least a first memory cell from the first set of memory cells. The method includes performing, by the memory device, a second program pass on the first set of memory cells.

In still yet another aspect, a memory device is disclosed. The memory device includes a plurality of memory cells and a control circuit coupled to the plurality of memory cells. The plurality of memory cells includes a first set of memory cells configured to be programmed into a first set of programming states each of which is not lower than a first predetermined programming state and a second set of memory cells configured to be programmed into a second set of programming states each of which is lower than the first predetermined programming state. The control circuit is configured to perform a first program pass on the first set of memory cells and the second set of memory cells. The control circuit is configured to continue to program at least a first memory cell from the first set of memory cells with one or more first programming voltages, where a first width of a first threshold voltage distribution of the first memory cell is different from a second width of a second threshold voltage distribution of a second memory cell from the second set of memory cells. The control circuit is configured to perform a second program pass on the first set of memory cells and the second set of memory cells.

In some implementations, the first width of the first threshold voltage distribution of the first memory cell is narrower than the second width of the second threshold voltage distribution of the second memory cell from the second set of memory cells.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 11 illustrates a table listing program pulses, programming states, and verify levels applied in a program operation, according to some aspects of the present disclosure.

DETAILED DESCRIPTION

Figure 1:
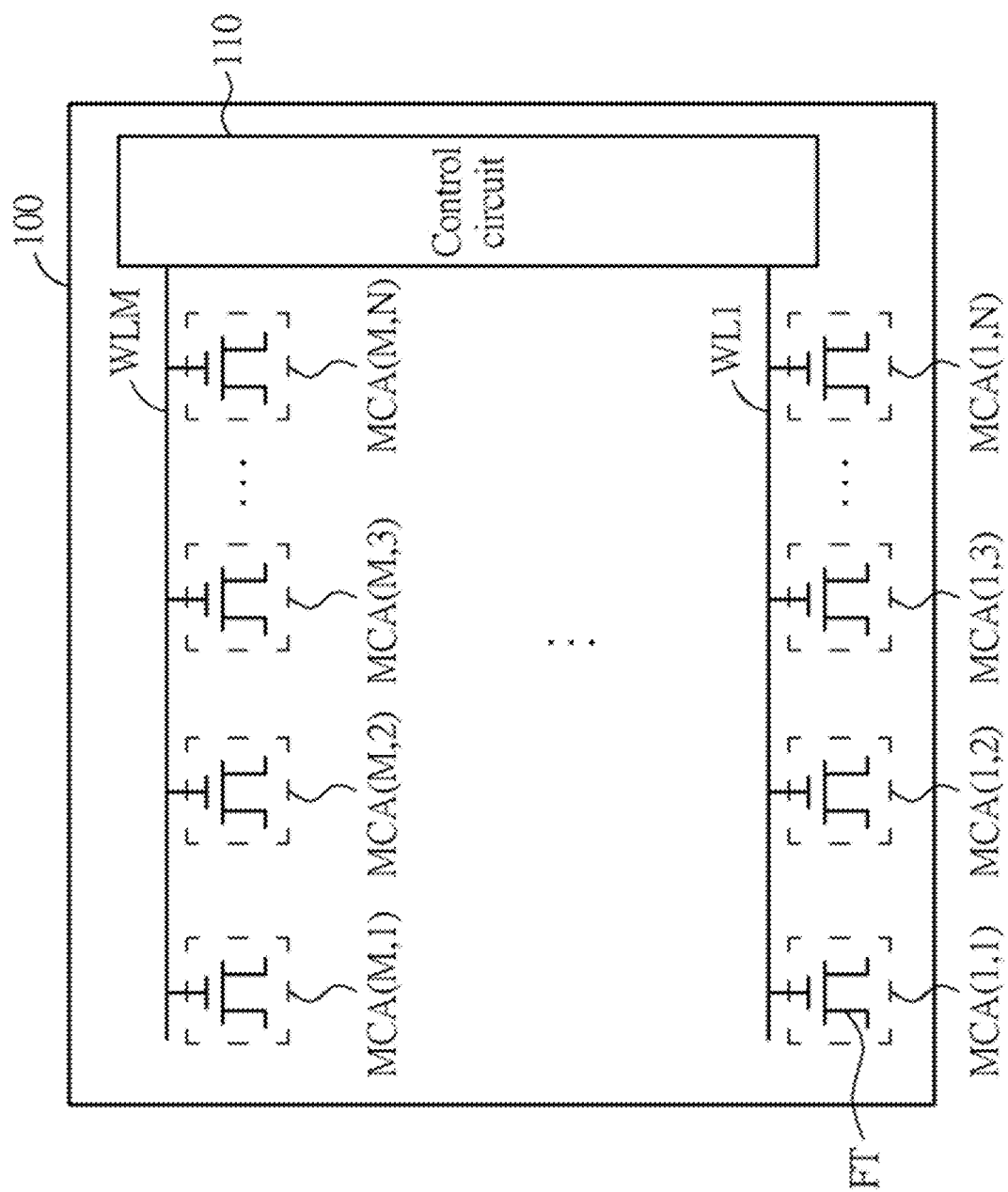
FIG. 1 shows a memory device according to some aspects of the present disclosure.

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Incremental Step Pulse Programming (ISPP) can be used in NAND programming, which uses incremental voltage pulses to inject electrons to the charge storing elements (e.g., trapping layers or floating gates) followed by a verification test. A memory cell may be configured to be programmed into a particular programming state. Once the memory cell passes a verification test in which a threshold voltage of the memory cell is greater than a verification voltage (also referred to as "verify level") corresponding to the programming state, the memory cell is locked out in the state machine and may no longer be programmed. In this case, if IVS occurs, the threshold voltage of the memory cell may drop below the verify level after the verification test, causing the data stored in the memory cell to become invalid. The IVS effect is more significant for a threshold voltage distribution corresponding to a higher programming state (equivalently, a higher verify level).

The present disclosure introduces an IVS reduction scheme that can reduce the IVS effect on the memory cells of a memory device, where the memory cells are configured to be programmed into programming states higher than a first predetermined programmed state. In the IVS reduction scheme disclosed herein, additional programming on the memory cells may be performed to reduce the IVS effect (e.g., one or more program pulses in one or more following program loops may be continued to be applied to the memory cells after the memory cells pass their respective verification tests, or the memory cells may be reprogrammed after a coarse program pass is performed on the memory cells but prior to a fine program pass is performed on the memory cells).

In some implementations, the IVS reduction scheme can be applied during a coarse program pass (or after the coarse program pass but before a fine program pass), which can further reduce the coupling effect for neighbor word lines in the fine program pass. Overprogramming of the memory cells can be acceptable since this over-programming may occur in the coarse program pass (or after the coarse program pass but prior to the fine program pass).

FIG. 1 shows a memory system 100 according to some aspects of the present disclosure. Memory system 100 includes a plurality of memory cells MCA(1,1) to MCA(M,N) and a control circuit 110, where M and N are positive integers. In some implementations of the present disclosure, the memory system 100 can include a flash memory, such as a NAND type flash memory.

In FIG. 1, N memory cells can be coupled to the same corresponding word line. For example, memory cells MCA(1,1) to MCA(1,N) can be coupled to a word line WL1, and memory cells MCA(M,1) to MCA(M,N) can be coupled to a word line WLM. Also, the control circuit 110 is coupled to the word lines WL1 to WLM for controlling the memory cells MCA(M,1) to MCA(M,N) for programming operations.

In some implementations, memory cells coupled to the same word line can be programmed at the same time by applying a program voltage through the word line.

In some implementations, the memory cells MCA(1,1) to MCA(M,N) can be multiple-level cells (MLC), including quad-level cells (QLC) and triple-level cells (TLC). That is, each of the memory cells MCA(1,1) to MCA(M,N) can store data of multiple bit states.

For example, each of the memory cells MCA(1,1) to MCA(M,N) can include a floating gate transistor FT. During a program operation of the memory cells MCA(1,1) to MCA(M,N), the gate terminals of the floating gate transistors FT of the memory cells MCA(1,1) to MCA(M,N) can receive a program voltage from the word lines WL1 to WLM, and the first terminals of the floating gate transistors FT of the memory cell MCA(1,1) to MCA(M,N) can receive a reference voltage. In some implementations, the program voltage can be greater than the reference voltage, and thus the high cross voltage between the gate terminals and the first terminals of the floating gate transistors FT may inject electrons to the gate structures of the floating gate transistors FT, thereby increasing the threshold voltages of the floating gate transistors FT.

By injecting sufficient electrons into the gate structures of the floating gate transistors FT, the threshold voltages of the floating gate transistors FT can be raised to the desired levels. Consequently, the state of data stored in the memory cells MCA(1,1) to MCA(M,N) can be identified according to the levels of the threshold voltages of the floating gate transistors FT of the memory cells MCA(1,1) to MCA(M, N).

For example, the memory cells MCA(1,1) to MCA(M,N) may be able to store eight different states of data. In this case, if the threshold voltage of the memory cell MCA(1,1) is smaller than a first verification voltage, then the memory cell MCA(1,1) may be deemed as not being programmed, and the memory cell MCA(1,1) may be deemed as having a first programming state. However, if the threshold voltage of the memory cell MCA(1,1) is greater than the first verification voltage, then the memory cell MCA(1,1) may be deemed as being programmed to have a second programming state. Also, if the memory cell MCA(1,1) is kept being programmed to have its threshold voltage being greater than a second verification voltage which is greater than the first verification voltage, then the memory cell MCA(1,1) may be deemed as being programmed to have a third programming state, and so on. In some other implementations, the memory cells MCA(1,1) to MCA(M,N) may be able to store more or less states of data, and the states of data may be represented by threshold voltages with different orders according to the application need.

However, after the memory cells MCA(1,1) to MCA(M, N) are programmed to the desired levels of threshold voltages, the threshold voltages of the memory cells MCA(1,1) to MCA(M,N) may be dropped within a short period of time (e.g., within tens of milliseconds), which is the so-called instant threshold voltage shift (or initial threshold voltage shift). The instant threshold voltage shift may result in the threshold voltages of some of the memory cells MCA(1,1) to MCA(M,N) dropping below their respective verification voltages, thereby causing the data stored in some of the memory cells MCA(1,1) to MCA(M,N) to fault.

To address one or more issues caused by the instant threshold voltage shift, multiple-programming has been proved to be effective. That is, after the memory cell has been programmed to have its threshold voltage become greater than its corresponding verification voltage, an additional program operation can be performed on the memory cell to reduce the instant threshold voltage shift of the memory cell.

Figure 2:
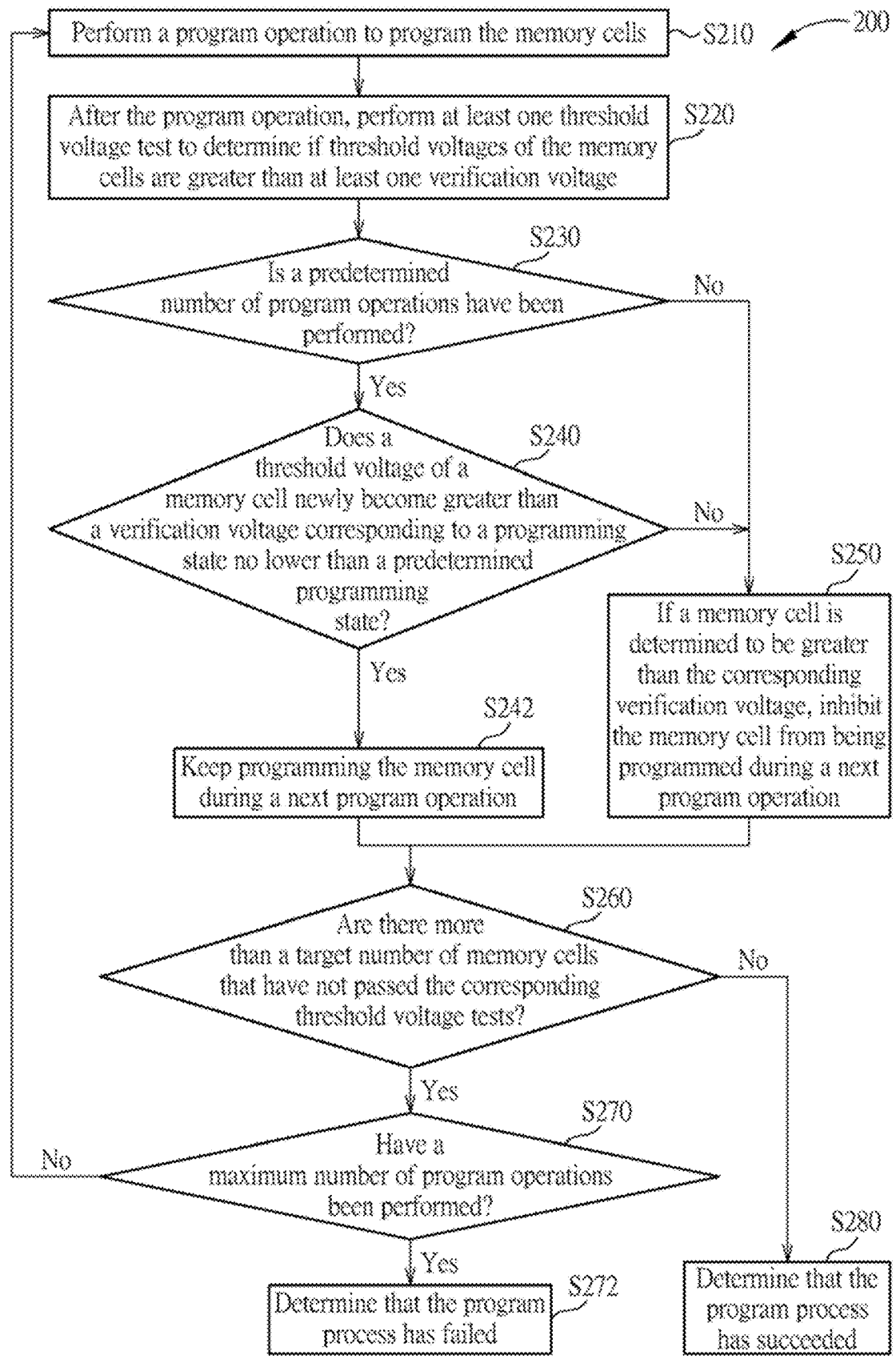
FIG. 2 shows a first method for operating a memory device, according to some aspects of the present disclosure.

FIG. 2 shows a method 200 for operating a memory device (e.g., the memory system 100) according to some aspects of the present disclosure. In some implementations, method 200 can include S210 to S280 as shown in FIG. 2, but is not limited to the order shown in FIG. 2.

S210: perform a program operation to program the memory cells MCA(1,1) to MCA(M,N);

S220: after the program operation, perform at least one threshold voltage test to determine if threshold voltages of the memory cells MCA(1,1) to MCA(M,N) are greater than at least one verification voltage;

S230: if a predetermined number of program operations have been performed, go to S240, otherwise go to S250;

S240: if a threshold voltage of a memory cell is determined to newly become greater than a verification voltage corresponding to a programming state not lower than a predetermined programming state, go to S242, otherwise go to S250. The programming state can be, for example, a target programming state which the memory cell is configured to be programmed into. In some implementations, if the threshold voltage of the memory cell is greater than the verification voltage corresponding to its target programming state for the first time, it is determined that the threshold voltage of the memory cell newly becomes greater than the verification voltage. In some implementations, if the threshold voltage of the memory cell is smaller than the verification voltage corresponding to its target programming state in all the previous program operations (or the previous program loops) but becomes greater than the verification voltage in the current program operation (or the current program loop), it is determined that the threshold voltage of the memory cell newly becomes greater than the verification voltage.

S242: keep programming the memory cell during a next program operation;

S250: if a memory cell is determined to have a threshold voltage greater than the corresponding verification voltage, inhibit the memory cell from being programmed during a next program operation;

S260: if there are more than a target number of memory cells that have not passed the corresponding threshold voltage tests, go to S270, otherwise go to S280;

S270: if a maximum number of program operations have been performed, go to S272, otherwise go to S210;

S272: determine that the program process has failed.

S280: determine that the program process has succeeded.

In some implementations, S210 to S280 can be performed by the control circuit 110. That is, the control circuit 110 can provide the desired program voltages according to the programming progress. A threshold voltage test may also be referred to as a verification test herein.

In S210, the program operation can be performed to raise the threshold voltages of the memory cells MCA(1,1) to MCA(M,N), and every time after the program operation is performed, at least one threshold voltage test can be performed to determine if the threshold voltages of the memory cells MCA(1,1) to MCA(M,N) are greater than at least one verification voltage. For example, a program operation may be performed to program the memory cell MCA(1,1) to have the second programming state. In this case, a threshold voltage test corresponding to the second programming state may be performed in S220. Also, the same program operation may also program the memory cell MCA(1,2) to have the third programming state. In this case, a threshold voltage test corresponding to the third programming state may also be performed in S220.

Generally, if the memory cell MCA(1,1) is meant to be programmed to have the second programming state and the memory cell MCA(1,1) has passed the threshold voltage test corresponding to the second programming state, then the memory cell MCA(1,1) would be inhibited during the next program operation as shown in S250. However, if the memory cell MCA(1,1) has not passed the threshold voltage test corresponding to the second programming state, meaning that the threshold voltage of the memory cell MCA(1,1) is still smaller than the corresponding verification voltage, then the memory cell MCA(1,1) may be programmed during the next program operation to keep raising its threshold voltage.

In FIG. 2, to reduce the instant threshold voltage shift, a reprogramming scheme can be applied when a predetermined number of program operations have been performed, and a threshold voltage of the memory cell is determined to newly become greater than a verification voltage that is not smaller than the predetermined verification voltage. Namely, for memory cells to be programmed to higher programming states, the additional program operation can be applied to further secure the threshold voltage.

For example, in some implementations, the predetermined verification voltage can be corresponding to the sixth programming state. In this case, if the memory cell MCA (1,2) is meant to be programmed to the sixth programming state and has been determined to newly become greater than the verification voltage corresponding to the sixth programming state in S220, then instead of being inhibited, the memory cell MCA(1,2) will be programmed again during the next program operation. Therefore, the affection of the instant threshold voltage shift on the memory cell MCA(1,2) can be reduced.

The additional program operations are performed on memory cells meant to be programmed to higher programming states because the issue of instant threshold voltage shift can become more significant when the threshold voltages of the memory cells become higher. Also, if the additional program operation is added when the memory cells have lower programming states, then the memory cells may be over-programmed when they are programmed to have higher programming states, which may deteriorate the memory cells and cause instability.

Therefore in 230, the number of program operations performed will be checked before applying the additional program operation to prevent over-programming. For example, in some implementations, before the $18^{th}$ program operation, the memory cells passing the threshold voltage tests will always be inhibited during the next program operation, as shown in S250. However, after the $17^{th}$ program operation, the additional program operation will be performed on those memory cells that are determined to newly become greater than the verification voltage corresponding to the higher programming states, as shown in S240 and S242.

In this case, if the threshold voltage of the memory cell MCA(1,1) is determined to be greater than the verification voltage corresponding to the first programming state, the memory cell MCA(1,1) will be inhibited during the next program operation, as shown in S250. After the program operations have been performed more than a predetermined number of times, for example, but not limited to 17 times, if the threshold voltage of the memory cell MCA(1,2) is determined to newly become greater than the verification voltage corresponding to the sixth programming state, the memory cell MCA(1,2) will be programmed again during the next program operation. However, before the program operations have not been performed more than 17 times, even if the threshold voltage of the memory cell MCA(1,3) is determined to newly become greater than the verification voltage corresponding to the sixth programming state, the memory cell MCA(1,3) will still be inhibited during the next program operation.

Furthermore, in some implementations, by reprogramming the memory cells having high programming states may be enough to prevent over programming. In this case, S230 may be omitted, and the additional program operation will be performed on all memory cells that have been determined to newly become greater than the verification voltages corresponding to higher programming states without considering the number of program operations that have been performed.

In addition, to improve the efficiency of the program operation, incremental step pulse programming (ISPP) can be applied to method 200. For example, in method 200, during a first program operation, a first program pulse may be generated to program the memory cells MCA(1,1) to MCA(M,N), while during a second program operation after the first program operation, a second program pulse may be generated to program the memory cells MCA(1,1) to MCA (M,N). In this case, the second program pulse can have a voltage greater than the first program pulse to help to increase the threshold voltages of the memory cells MCA (1,1) to MCA(M,N) in the second program operation.

After S240, S242, and S250, S260 can be performed to determine if there are more than a target number of memory cells that have not passed the corresponding threshold voltage tests. If there are more than the target number of memory cells that have not passed the corresponding threshold voltage tests, it may imply that the memory system 100 has not been programmed successfully and may need more times of program operation. However, if there are less than the target number of memory cells that have not passed the corresponding threshold voltage tests, it may imply that the memory system 100 has been programmed successfully as concluded in S280.

Furthermore, in some implementations, the total number of program operations can be limited to be under a maximum number to prevent over-programming and endless operations. Therefore, in S270, if the program operations have been performed more than the maximum number of times, then the program process will be determined to have failed in S272. Otherwise, the next program operation will be performed in S210.

With method 200, the threshold voltages of the memory cells can be steadily secured, and the retention error caused by instant threshold voltage shift can be reduced.

Figure 3:
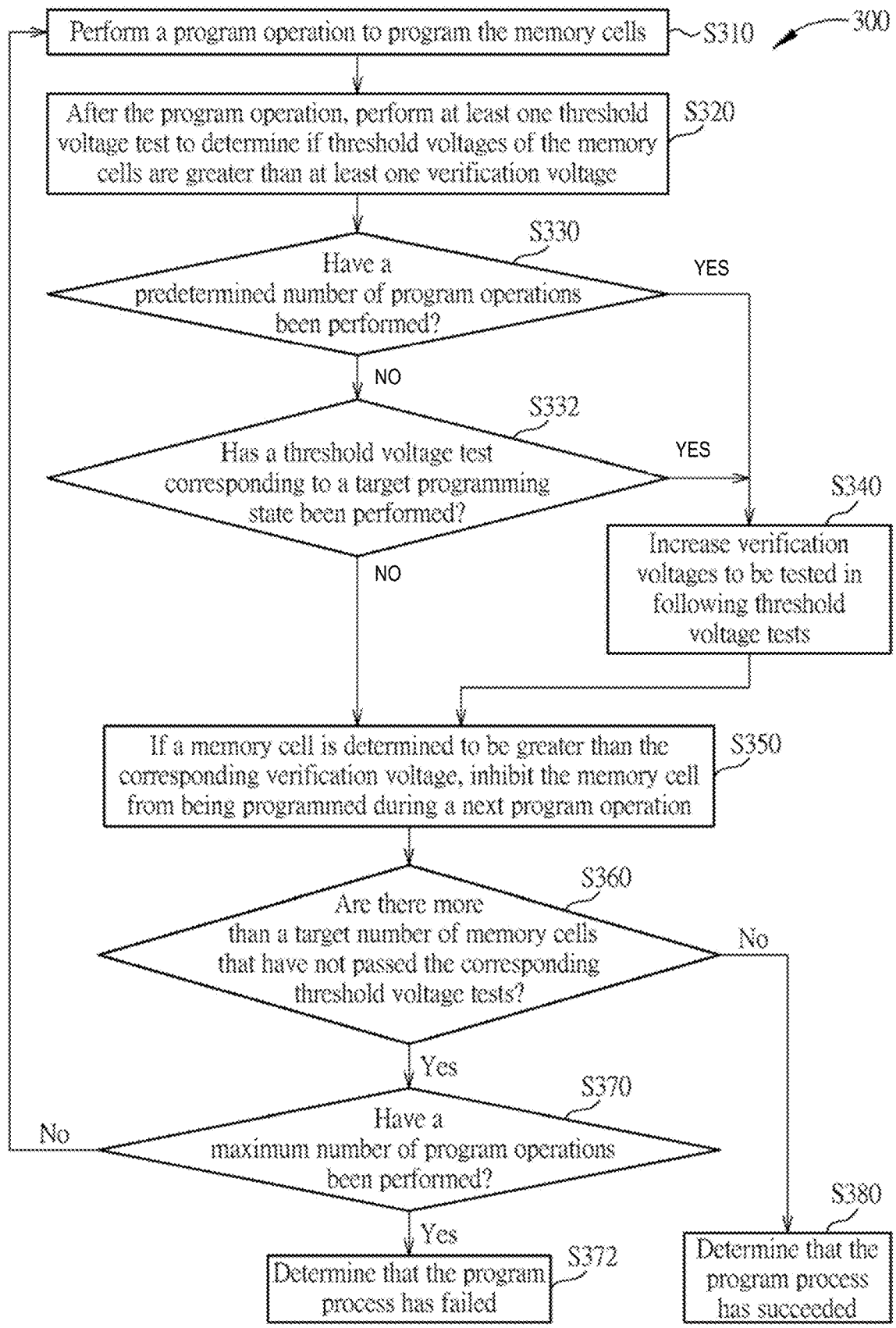
FIG. 3 shows a second method for operating a memory device, according to some aspects of the present disclosure.

FIG. 3 shows a method 300 for operating a memory device (e.g., the memory system 100) according to some aspects of the present disclosure. In some implementations, method 300 can include S310 to S380, as shown in FIG. 3A, but is not limited to the order shown in FIG. 3A.

S310: perform a program operation to program the memory cells MCA(1,1) to MCA(M,N);

S320: after the program operation, perform at least one threshold voltage test to determine if threshold voltages of the memory cells MCA(1,1) to MCA(M,N) are greater than at least one verification voltage;

S330: if a predetermined number of program operations have been performed, go to S340, otherwise go to S332;

S332: if a threshold voltage test corresponding to a target programming state has been performed, go to S340, otherwise go to S350;

S340: increase verification voltages to be tested in the following threshold voltage tests. S332 and S340 are described together herein using two examples. In a first example, assuming that the target programming state of S332 is the fifth programming state (P5). With reference to TABLE 2 of FIG. 11 which is described below in more detail, when the threshold voltage test for the fifth programming state (P5) finishes at the $13^{th}$ program pulse (Pulse 13), then the verification voltages to be tested in the following threshold voltage test for the sixth and/or seventh programming states (P6, P7) at the $14^{th}$ to $17^{th}$ program pulses (Pulses 14-17) may be increased in S340. In a second example, assuming that the target programming state of S332 is the sixth programming state (P6). When the threshold voltage test for the sixth programming state (P6) finishes at Pulse 15, then the verification voltages to be tested in the following threshold voltage test for the seventh programming state (P7) at Pulses 16 and 17 may be increased in S340.

S350: if a memory cell is determined to be greater than the corresponding verification voltage, inhibit the memory cell from being programmed during a next program operation;

S360: if there are more than a target number of memory cells that have not passed the corresponding threshold voltage tests, go to S370, otherwise go to S380;

S370: if a maximum number of program operations have been performed, go to S372, otherwise go to S310;

S372: determine that the program process has failed.

S380: determine that the program process has succeeded.

In some implementations, S310 to S380 can be performed by the control circuit 110. That is, the control circuit 110 can provide the desired program voltages according to the programming progress.

In method 300, instead of performing additional program operations, the verification voltage can be increased to reduce the retention error caused by the instant threshold voltage shift.

For example, after the program operation in S310 and the threshold voltage tests in S320 are performed, S330 will determine if the predetermined number of program operations have been performed. If the program operations have been performed more than the predetermined number of times, for example, but not limited to 17 times, then the verification voltages to be tested in the following threshold voltage tests will be increased in S340. That is, to pass the threshold voltage corresponding to a specific programming state, the threshold voltage of the memory cell must be higher than a previous standard level. Consequently, even if the instant threshold voltage shift occurs, the threshold voltage of the memory cell will still be high enough to acquire the desired programming state during the read operation.

Also, the programming state of the threshold voltage test will be checked in S332. In this case, if the threshold voltage test corresponding to a target programming state, for example, but not limited to the sixth programming state, has been performed, then the verification voltages to be tested in the following threshold voltage tests will be increased in S340. Therefore, memory cells that are meant to be programmed to higher programming states (e.g., programming states higher than the target programming state of S332) and are more difficult to be programmed will be tested more strictly during the program process to prevent the instant threshold voltage shift from causing retention errors.

One of the reasons for not increasing the verification voltages at the very beginning of the program process is to protect the memory cells MCA(1,1) to MCA(M,N) from being over-programmed. However, in some implementations, one of the S330 and S332 may be omitted if the condition of the memory system 100 allows it.

With combined reference to FIGS. 1-3 described herein, the memory system 100 and the methods 200 and 300 for programming the memory device provided by some aspects of the present disclosure can perform additional program operations to memory cells that have newly passed the threshold voltage tests or can increase the verification voltages in the threshold voltage tests corresponding to higher programming states. Therefore, the memory cells can be programmed to have threshold voltages greater than the verification voltages used in the read operation with sufficient headroom, preventing the retention errors caused by the instant threshold voltage shift and securing the reading voltage margin.

Figure 4:
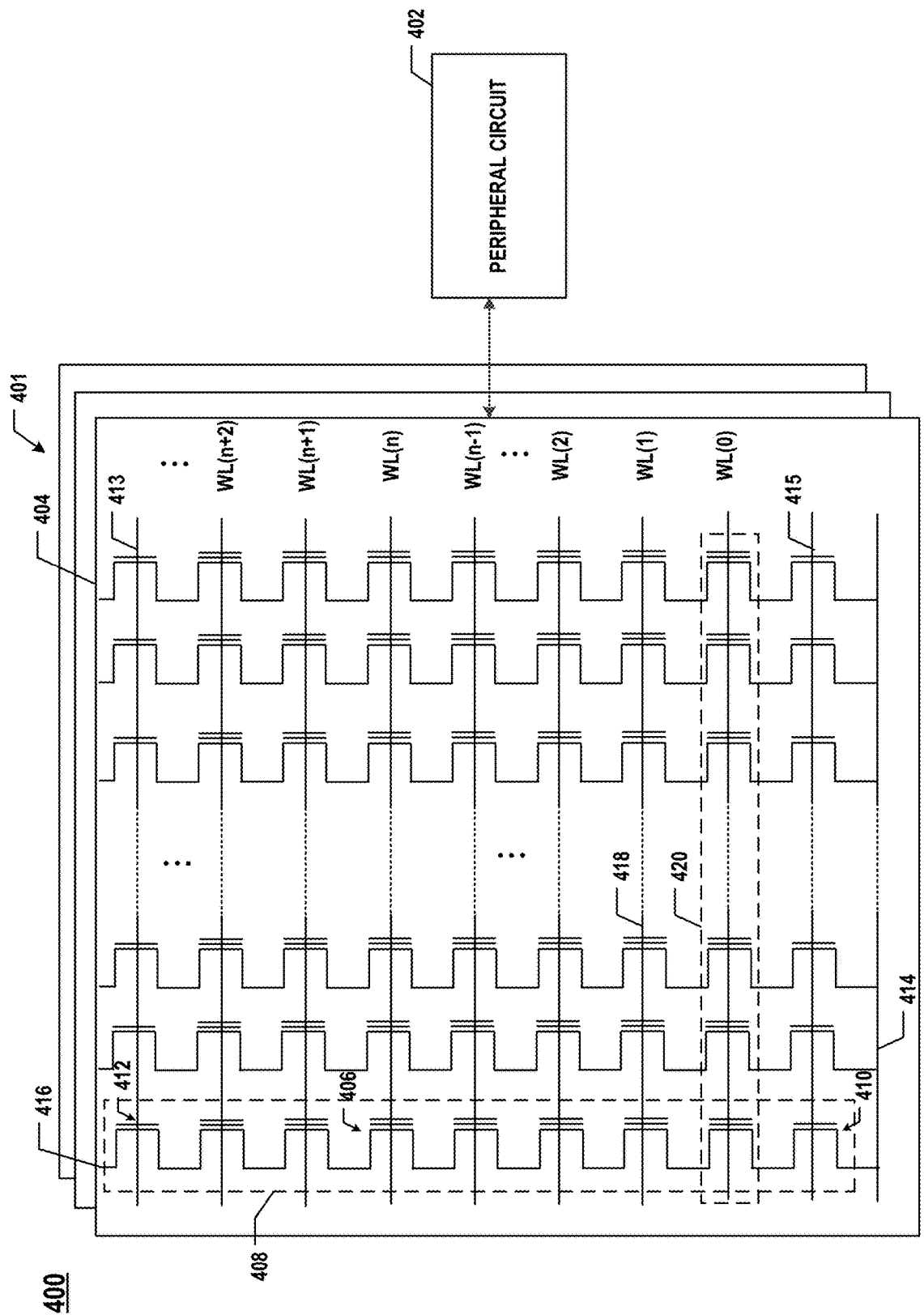
FIG. 4 illustrates a schematic diagram of a memory device including peripheral circuits, according to some aspects of the present disclosure.

FIG. 4 illustrates a schematic diagram of a memory device 400 including peripheral circuits 402, according to some aspects of the present disclosure. Memory device 400 can be an example of memory system 100 in FIG. 1. Memory device 400 can include a memory cell array 401 and peripheral circuits 402 coupled to memory cell array 401. Memory cell array 401 can be a NAND Flash memory cell array in which memory cells 406 are provided in an array of NAND memory strings 408 each extending vertically above a substrate (not shown). In some implementations, each NAND memory string 408 includes a plurality of memory cells 406 coupled in series and stacked vertically. Each memory cell 406 can hold a continuous, analog value, such as an electrical voltage or charge, that depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 406 is a multi-level cell (MLC) that is capable of storing more than a single bit of data in more than four memory states. For example, the MLC can store two bits per cell, three bits per cell (also known as TLC), or four bits per cell (also known as QLC). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 4, each NAND memory string 408 can also include a source select gate (SSG) transistor 410 at its source end and a drain select gate (DSG) transistor 412 at its drain end. SSG transistor 410 and DSG transistor 412 can be configured to activate select NAND memory strings 408 (columns of the array) during read and program operations. In some implementations, the sources of NAND memory strings 408 in the same block 404 are coupled through a same source line (SL) 414, e.g., a common SL. In other words, all NAND memory strings 408 in the same block 404 have an array common source (ACS), according to some implementations. The drain of each NAND memory string 408 is coupled to a respective bit line 416 from which data can be read or written via an output bus (not shown), according to some implementations. In some implementations, each NAND memory string 408 is configured to be selected or deselected by applying a DSG select voltage or a DSG unselect voltage to the gate of respective DSG transistor 412 through one or more DSG lines 413 and/or by applying an SSG select voltage or an SSG unselect voltage to the gate of respective SSG transistor 410 through one or more SSG lines 415.

As shown in FIG. 4, NAND memory strings 408 can be organized into multiple blocks 404, each of which can have a common source line 414, e.g., coupled to an ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive voltage (e.g., 20 V or more). Memory cells 406 of adjacent NAND memory strings 408 can be coupled through word lines 418 that select which row of memory cells 406 is affected by read and program operations. In some implementations, each word line 418 is coupled to a physical page 420 of memory cells 406, which is the basic data unit for program and read operations. The size of one physical page 420 in bits can relate to the number of NAND memory strings 408 coupled by word line 418 in one block 404. Each word line 418 can include a plurality of control gates (gate electrodes) at each memory cell 406 on respective physical page 420 and a gate line coupling the control gates. With reference to FIG. 4, a plurality of word lines WL(0), WL(1), WL(2), WL(n−1), WL(n), WL(n+1), and WL(n+2) are illustrated, with n being a positive integer.

Figure 5A:
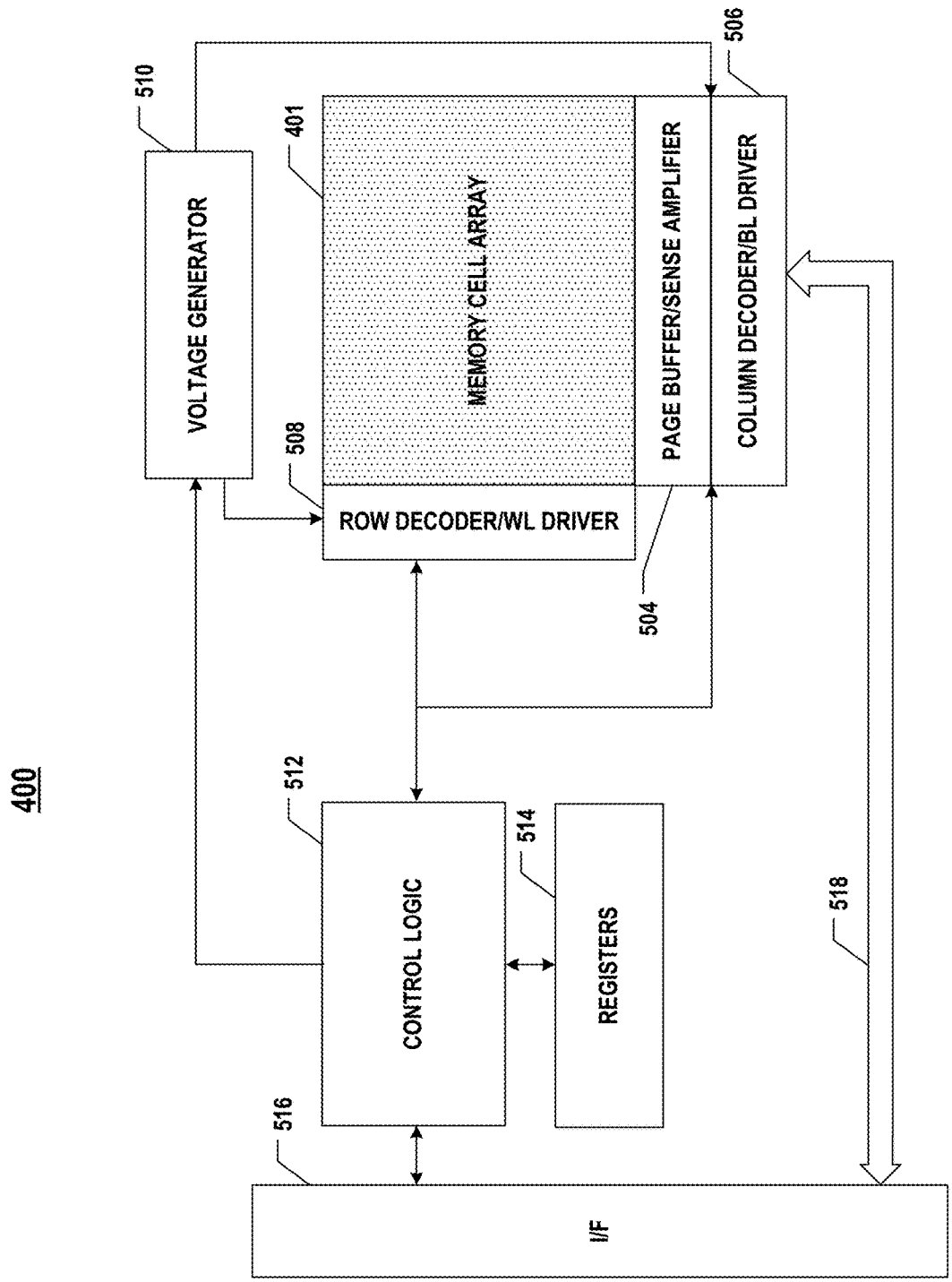
FIG. 5A illustrates a block diagram of a memory device including a memory cell array and peripheral circuits, according to some aspects of the present disclosure.

Peripheral circuits 402 can be coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each target memory cell 406 through bit lines 416, word lines 418, source lines 414, SSG lines 415, and DSG lines 413. Peripheral circuits 402 can include various types of peripheral circuits formed using metal-oxide-semiconductor (MOS) technologies. For example, FIG. 5A illustrates some peripheral circuits including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5A may be included as well.

Page buffer/sense amplifier 504 can be configured to read and program (write) data from and to memory cell array 401 according to the control signals from control logic 512. In one example, page buffer/sense amplifier 504 may store one page of program data (write data) to be programmed into one page physical 420 of memory cell array 401. In another example, page buffer/sense amplifier 504 may verify programmed target memory cells 406 in each program/verify loop (cycle) in a program operation to ensure that the data has been properly programmed into memory cells 406 coupled to selected word lines 418. In still another example, page buffer/sense amplifier 504 may also sense the low power signals from bit line 416 that represents a data bit stored in memory cell 406 and amplify the small voltage swing to recognizable logic levels in a read operation. In program operations, page buffer/sense amplifier 504 can include storage modules (e.g., latches, caches, registers, etc.) for temporarily storing a set of N-bits data (e.g., in the form of gray codes) received from data bus 518 and providing the set of N-bits data to a corresponding target memory cell 406 through the corresponding bit line 416 in each program pass of a multi-pass program operation.

Column decoder/bit line driver 506 can be configured to be controlled by control logic 512 and select one or more NAND memory strings 408 by applying bit line voltages generated from voltage generator 510. Row decoder/word line driver 508 can be configured to be controlled by control logic 512 and select/deselect blocks 404 of memory cell array 401 and select/deselect word lines 418 of block 404. Row decoder/word line driver 508 can be further configured to drive word lines 418 using word line voltages generated from voltage generator 510. In some implementations, row decoder/word line driver 508 can also select/deselect and drive SSG lines 415 and DSG lines 413 as well. Voltage generator 510 can be configured to be controlled by control logic 512 and generate the word line voltages (e.g., read voltage, program voltage, channel pass voltage, local voltage, verify voltage, etc.), bit line voltages, and source line voltages to be supplied to memory cell array 401.

Control logic 512 can be coupled to each peripheral circuit described above and configured to control the operations of each peripheral circuit. Registers 514 can be coupled to control logic 512 and include status registers, command registers, and address registers for storing status information, command operation codes (OP codes), and command addresses for controlling the operations of each peripheral circuit. Interface 516 can be coupled to control logic 512 and act as a control buffer to buffer and relay control commands received from a host (e.g., 1808 in FIG. 18) to control logic 512 and status information received from control logic 512 to the host. Interface 516 can also be coupled to column decoder/bit line driver 506 via data bus 518 and act as a data input/output (I/O) interface and a data buffer to buffer and relay the data to and from memory cell array 401.

Figure 5B:
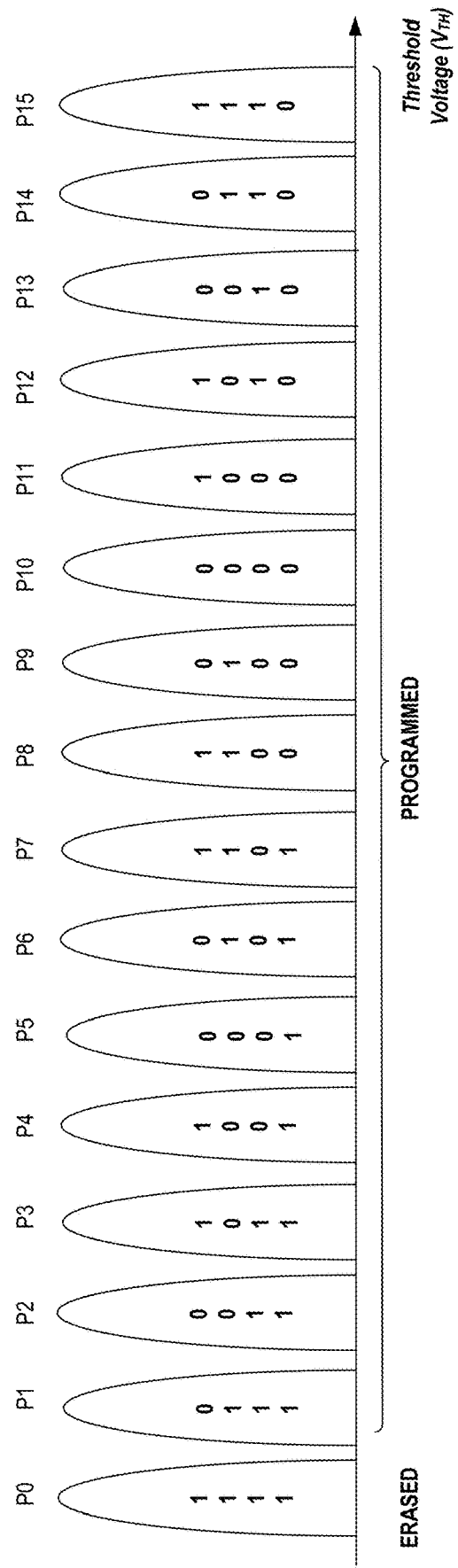
FIG. 5B illustrates threshold voltage distributions of memory cells in a program operation, according to some aspects of the present disclosure.

FIG. 5B illustrates threshold voltage distributions of memory cells in a program operation, according to some aspects of the present disclosure. As described above, each memory cell 406 can be configured to store a set of N-bits data in one of 2N levels, where N is an integer greater than 1 (e.g., N=2 for MLCs, N=3 for TLCs, N=4 for QLCs, etc.). Each level can correspond to one of $2^N$ threshold voltage (Vth) ranges of memory cells 406. Considering a multi-pass program operation in which memory cell 406 may be programmed into an intermediate level first in a coarse program pass, the "level" referred to herein may be considered as the final level after the fine program pass of the multi-pass program operations, in contrast to the intermediate level. Taking QLCs, where N=4, for example, as shown in FIG. 5B, memory cell 406 may be programmed into one of the 16 levels, including one level of the erased state ("P0") and 15 levels of the programming states (programming states "P1-P15"). Each level may correspond to a respective threshold voltage (Vth) range of memory cells 406. For example, the level corresponding to the lowest threshold voltage range (the left-most threshold voltage distribution in FIG. 5B) may be considered as level 0, the level corresponding to the second-lowest threshold voltage range (the second left-most threshold voltage distribution in FIG. 5B) may be considered as level 1, and so until level 15 corresponding to the highest threshold voltage range (the right-most threshold voltage distribution in FIG. 5B).

On the other hand, each level can correspond to one of the $2^N$ sets of N-bits data that is to be stored in target memory cell 406. In some implementations, the $2^N$ sets of N-bits data may be represented by (in the form of) a gray code. A gray code (a.k.a. reflected binary code (RBC) or reflected binary (RB)) is an ordering of the binary numeral system such that two successive values differ in only one bit (binary digit). For example, TABLE 1 below shows an example of a binary code representing a one-to-one mapping between 16 levels (Lvl 0 to Lvl 15) and 16 sets of 4-bits data used in the example of FIG. 5B. As shown in TABLE 1, each set of 4-bits data may consist of four bits of binary values (b1, b2, b3, and b4). In one example, level 1 may correspond to a set of 4-bits data having a value of 1111. In another example, level 15 may correspond to another set of 4-bits data having a value of 1110.

TABLE 1

| Lvl | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| b1 | 1 | 0 | 0 | 0 | 1 | 1 | 0 | 0 | 0 | 0 | 0 | 1 | 1 | 1 | 1 | 1 |
| b2 | 1 | 1 | 1 | 0 | 0 | 0 | 0 | 1 | 1 | 0 | 0 | 0 | 0 | 1 | 1 | 1 |
| b3 | 1 | 1 | 1 | 1 | 1 | 0 | 0 | 0 | 0 | 1 | 1 | 0 | 0 | 0 | 0 | 1 |
| b4 | 1 | 1 | 0 | 0 | 0 | 0 | 0 | 0 | 1 | 1 | 1 | 1 | 1 | 1 | 0 | 0 |

Also referring to FIG. 5A, in a program operation, Q pages of the N-bits data transmitted through data bus 518 can be temporarily stored in page buffer/sense amplifier 504, and page buffer/sense amplifier 504 can be configured to provide to each target memory cell 406 the corresponding set of N-bits data through the corresponding bit line 416. Q is a positive integer. In some implementations, page buffer/sense amplifier 504 includes N storage modules (e.g., latches and/or caches) each configured to temporarily store one of Q pages of data. That is, the N-bits data (having $2^N$ values) to be stored by a physical page 420 of target memory cells 406 coupled to a selected word line 418 can be transmitted, stored, and provided in the form of Q pages of N-bits data in a program operation.

Figure 6A:
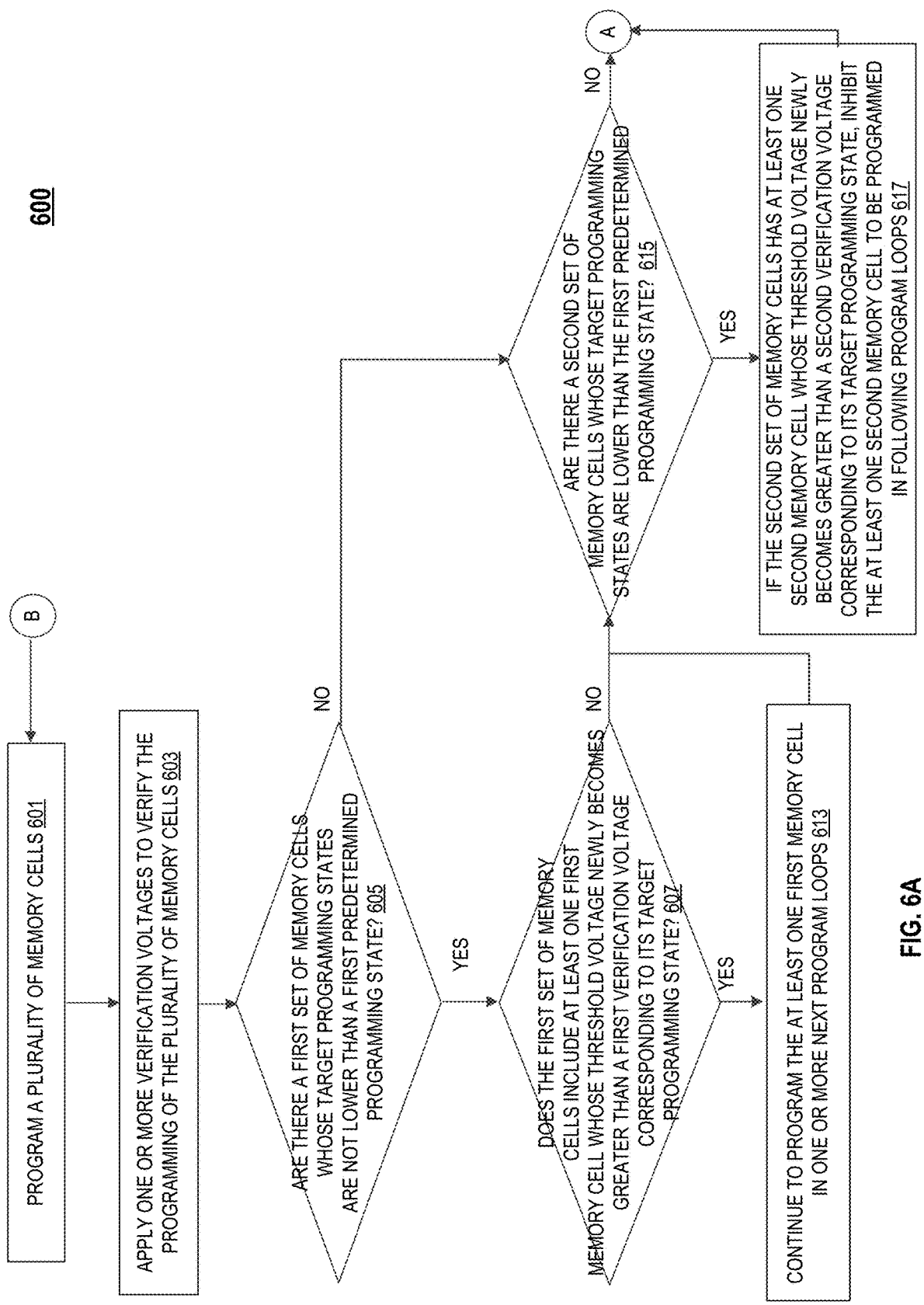
FIGS. 6A-6B illustrate a flowchart of a third method for operating a memory device, according to some aspects of the present disclosure.
Figure 6B:
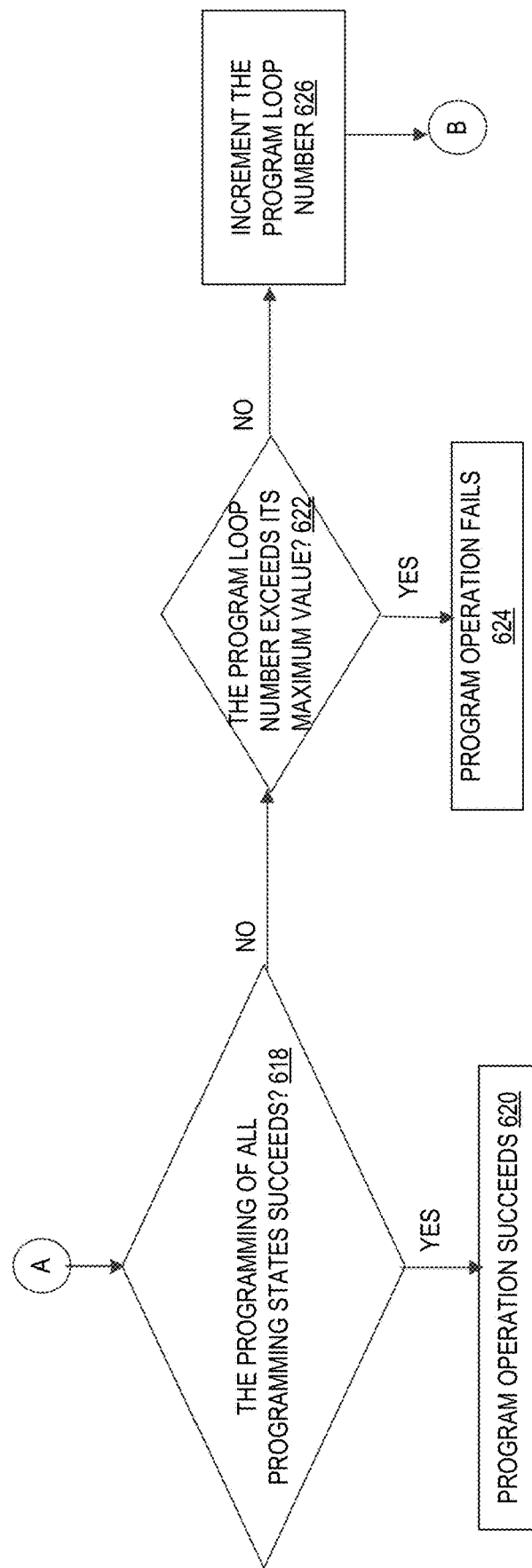

FIGS. 6A-6B illustrate a flowchart of a third method 600 for operating a memory device, according to some aspects of the present disclosure. The memory device may be any suitable memory device disclosed herein, such as memory system 100 or memory device 400. Method 600 may be implemented by a control circuit, such as control circuit 110 or control logic 512. It is understood that the operations shown in method 600 may not be exhaustive and that other operations can be performed as well before, after, or between any of the illustrated operations. Further, some of the operations may be performed simultaneously, or in a different order than shown in FIG. 6A.

In some implementations, method 600 may be configured to perform a program operation on a plurality of memory cells. Method 600 may be executed with a plurality of program loops, as shown in FIG. 6A. Method 600 can be an implementation of the IVS reduction scheme disclosed herein.

Initially, a program loop number is initiated. For example, the program loop number can be initiated as "1" at the start of the program operation (e.g., Loop=1). The program loop number can be used to identify a current program loop in the program operation.

Referring to FIG. 6A, method 600 starts at operation 601, in which a plurality of memory cells of the memory device are programmed. For example, the plurality of memory cells may be coupled to a word line. A program voltage corresponding to a current program loop can be applied to the word line (e.g., row decoder/word line driver 508 may apply a program voltage to the word line). For each memory cell, a corresponding set of N-bits data to be stored on the memory cell can be provided to the memory cell through a respective bit line associated with the memory cell (e.g., page buffer/sense amplifier 504 may provide a corresponding set of 4-bits data (e.g., N=4) to each memory cell through a respective bit line associated with the memory cell). It is understood that different program voltages (or the same program voltage) can be applied in different program loops, which is not limited herein.

Method 600 proceeds to operation 603, as illustrated in FIG. 6A, in which one or more verification voltages are applied to verify the programming of the plurality of memory cells. Specifically, one or more verification voltages corresponding to the current program loop can be applied to the word line to verify whether memory cells configured to be programmed into one or more programming states corresponding to the one or more verification voltages pass their respective verification tests. For example, assuming that the current program loop may have two verification voltages V1 and V2 for two programming states P1 and P2, respectively. The verification voltage V1 can be applied to the word line to verify whether threshold voltages of memory cells (whose target programming states are the programming state P1) are greater than the verification voltage V1. Next, the verification voltage V2 can also be applied to the word line to verify whether threshold voltages of memory cells (whose target programming states are the programming state P2) are greater than the verification voltage V2. Consistent with some implementations of the present disclosure, a target programming state of a memory cell may be referred to as a programming state which the memory cell is configured (or intended) to be programmed into.

Method 600 proceeds to operation 605, as illustrated in FIG. 6A, in which it is determined whether there are a first set of memory cells in the plurality of memory cells, where the first set of memory cells has a set of target programming states each of which is not lower than a first predetermined programming state. For example, the first predetermined programming state can be the programming state "P6" for TLCs or the programming state "P13" for QLCs. If there are the first set of memory cells, method 600 may proceed to operation 607. Otherwise, method 600 may proceed to operation 615.

At operation 607, it is determined whether the first set of memory cells includes at least one first memory cell, where the at least one first memory cell has a threshold voltage that newly becomes greater than a first verification voltage corresponding to a target programming state of the at least one first memory cell. Responsive to the first set of memory cells including at least one first memory cell whose threshold voltage newly becomes greater than the first verification voltage, method 600 proceeds to operation 613. Otherwise, method 600 proceeds to operation 615. For example, if the threshold voltage of the at least one first memory cell is smaller than the first verification voltage in all the previous program loops but becomes greater than the first verification voltage in the current program loop, it is determined that the threshold voltage of the at least one first memory cell newly becomes greater than the first verification voltage. In another example, if the threshold voltage of the at least one first memory cell is smaller than the first verification voltage previously but is greater than the first verification voltage for the first time in the current program loop, it is determined that the threshold voltage of the at least one first memory cell newly becomes greater than the first verification voltage.

At operation 613, method 600 may continue to program the at least one first memory cell with one or more programming voltages in one or more next program loops. For example, when the threshold voltage of the at least one first memory cell newly becomes greater than the first verification voltage, operation 607 may still permit the at least one first memory cell to be programmed with one or more programming voltages in one or more following program loops (e.g., the at least one first memory cell is not locked out from programming in the one or more following program loops). That is, additional programming can be performed on the first memory cell in the one or more following program loops.

At operation 615, it is determined whether there are a second set of memory cells in the plurality of memory cells, where the second set of memory cells has a second set of target programming states each of which is lower than the first predetermined programming state. If there are the second set of memory cells, method 600 may proceed to operation 617. Otherwise, method 600 may proceed to operation 618 of FIG. 6B.

At operation 617, if the second set of memory cells has at least one second memory cell whose threshold voltage newly becomes greater than a second verification voltage corresponding to its target programming state, method 600 may inhibit the at least one second memory cell to be programmed in following program loops. Method 600 then proceeds to operation 618 of FIG. 6B.

Method 600 proceeds to operation 618, as illustrated in FIG. 6B, in which it is determined whether the programming of all programming states succeeds. If yes, method 600 proceeds to operation 620. Otherwise, method 600 proceeds to operation 622.

For example, for each programming state, it is determined whether a total number of failed memory cells, which are memory cells having the programming state as their target programming state and failing to pass their corresponding verification voltage, is smaller than a failure threshold. If the total number of failed memory cells for the programming state is smaller than the failure threshold, then it is determined that the programming of the programming state succeeds. If the programming of all the programming states succeeds, then method 600 proceeds to operation 620. Otherwise, method 600 proceeds to operation 622.

At operation 620, it is determined that the program operation of the plurality of memory cells succeeds.

At operation 622, it is determined whether the program loop number exceeds its maximum value (e.g., a maximum program loop number). Responsive to the program loop number exceeding its maximum value, method 600 may proceed to operation 624. Otherwise, method 600 proceeds to operation 626.

At operation 624, it is determined that the program operation of the plurality of memory cells fails.

At operation 626, the program loop number is incremented (e.g., Loop=Loop+1). Method 600 returns to operation 601 of FIG. 6A to continue performing a next program loop.

Consistent with some implementations of the present disclosure, memory cells whose programming states are not lower than the first predetermined programming state can be referred to as high-state memory cells. For example, for a TLC memory device, the first predetermined programming state can be the fifth programming state P5. Memory cells whose target programming states are the sixth or seventh programming state (P6 or P7) can be considered as high-state memory cells. In another example, for a QLC memory device, the first predetermined programming state can be the thirteenth programming state P13. Memory cells whose target programming states are the fourteenth or fifteenth programming state (P14 or P15) can be considered as high-state memory cells.

Unlike some other methods which stop programming all the memory cells if their threshold voltages are equal to or greater than their respective verification voltages, method 600 continues to program the high-state memory cells even if their threshold voltages are equal to or greater than their respective verification voltages so that the IVS effect is reduced. Here, the respective verification voltages of the memory cells may be verification voltages corresponding to the respective target programming states of the memory cells. For example, if a memory cell is configured to be programmed into a programming state of P6, then a verification voltage of the memory cell may be a verification voltage corresponding to the programming state P6.

In some implementations, only part of the high-state memory cells are continued to be programmed in one or more next program loops after their threshold voltages are equal to or greater than their respective verification voltages. In some other implementations, all the high-state memory cells are continued to be programmed in one or more next program loops after their threshold voltages are equal to or greater than their respective verification voltages.

In some implementations, some high-state memory cells may have the same programming state. These high-state memory cells can be continued to be programmed together in one or more next program loops after the programming of the corresponding programming state is finished. For example, with reference to FIG. 11 of a TLC memory device, the programming of the sixth programming state P6 is finished at the fifteenth program pulse (Pulse 15). Then, for high-state memory cells whose programming state is the sixth programming state P6, one or more additional programming voltages after Pulse 15 (e.g., Pulse 16, Pulse 17, or both) can be applied to continue to program the high-state memory cells.

In some other implementations, the high-state memory cells are continued to be programmed individually in one or more next program loops after their respective threshold voltages newly become equal to or greater than their respective verification voltages. Specifically, if a threshold voltage of a high-state memory cell newly becomes equal to or greater than its respective verification voltage in a program loop L, then the high-state memory cell is continued to be programmed using one or more programming voltages in one or more next program loops (e.g., the program loops L+1, L+2, etc.). For example, with reference to FIG. 11 of the TLC memory device again, assuming that a high-state memory cell has a target programming state of the sixth programming state P6, and a threshold voltage of the high-state memory cell newly becomes greater than its corresponding verification voltage at Pulse 12. Then, one or more programming voltages after Pulse 12 (e.g., Pulse 13, Pulse 14, etc.) can be applied to continue to program the high-state memory cell.

In some implementations, a total number of program voltages (e.g., program pulses) used to continue programming a high-state memory cell may be determined based on a programming speed of the high-state memory cell. For example, a smaller number of program voltages can be applied to continue programming a high-state memory cell that has a fast programming speed, whereas a larger number of program voltages can be applied to continue programming another high-state memory cell that has a slow programming speed. In a further example, with reference to FIG. 11 again, assuming that both a first high-state memory cell and a second high-state memory cell are configured to be programmed into the sixth programming state P6. A threshold voltage of the first high-state memory cell newly becomes greater than a verification voltage corresponding to the sixth programming state P6 at Pulse 11, whereas a threshold voltage of the second high-state memory cell newly becomes greater than the verification voltage corresponding to the sixth programming state P6 at Pulse 14. Thus, the programming speed of the first high-state memory cell is faster than that of the second high-state memory cell. Accordingly, an additional programming voltage (e.g., Pulse 12) can be applied to continue programming the first high-state memory cell in the $12^{th}$ program loop, whereas two additional programming voltages (e.g., Pulse 15, Pulse 16) can be applied to continue programming the second high-state memory cell in the $15^{th}$ and $16^{th}$ program loops, respectively.

Consistent with some implementations of the present disclosure, operations 607 and 613 of method 600 may be replaced by an operation to label the first set of memory cells as "high-state memory cells." That is, if there are the first set of memory cells whose target programming states are not lower than the first predetermined programming state at operation 605, then method 600 may mark the first set of memory cells as "high-state memory cells," which can be reprogrammed later. For example, the first set of memory cells may be reprogrammed with the same corresponding sets of N-bits data after the current program pass completes (e.g., with respect to FIG. 11, after all the program pulses Pulse 1-Pulse 17 in the program pass are applied in the program operation). In some implementations, only part of the high-state memory cells are reprogrammed. In some other implementations, all the high-state memory cells are reprogrammed.

Figure 6C:
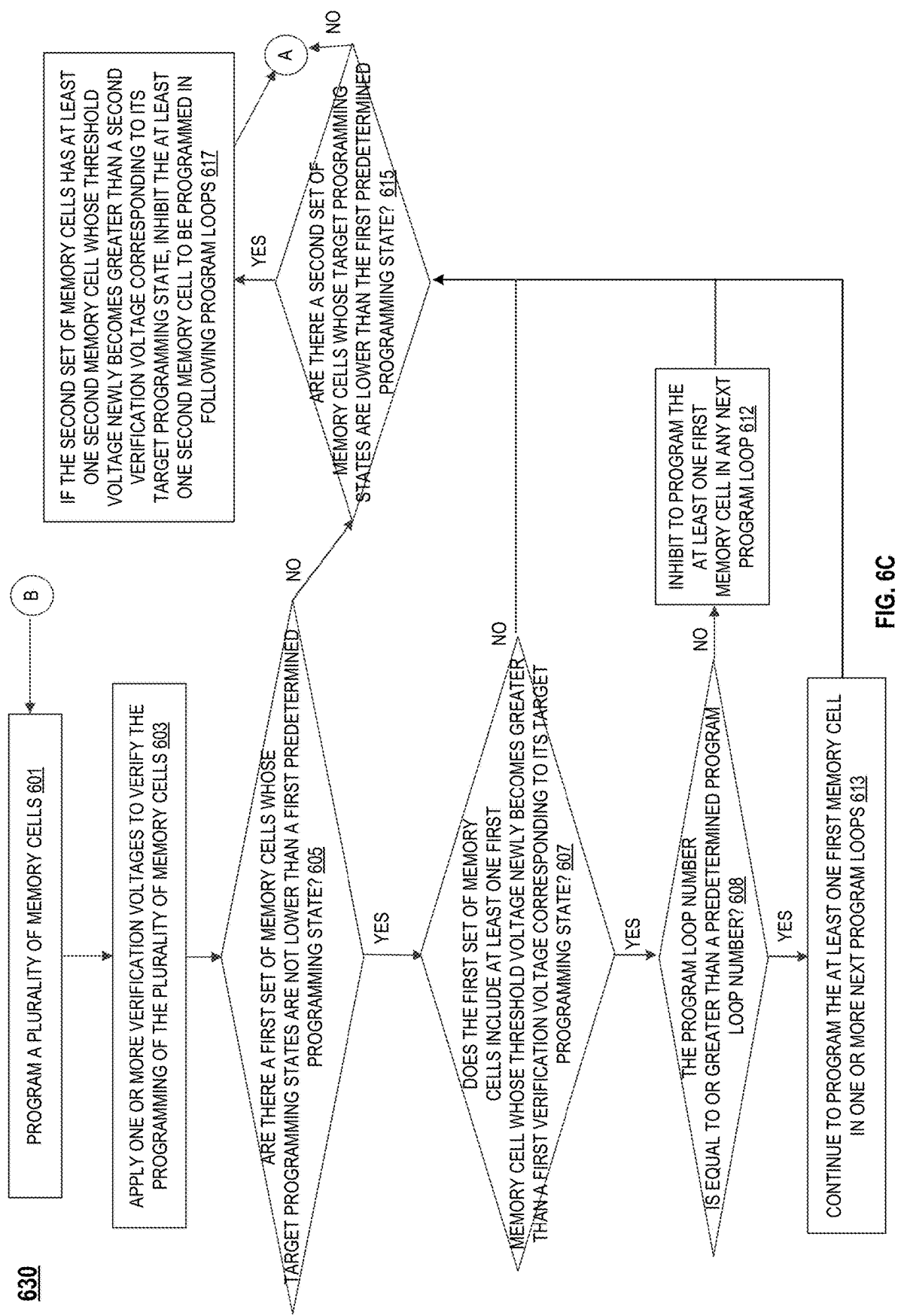
FIGS. 6C-6D illustrate a flowchart of a fourth method for operating a memory device, according to some aspects of the present disclosure.
Figure 6D:
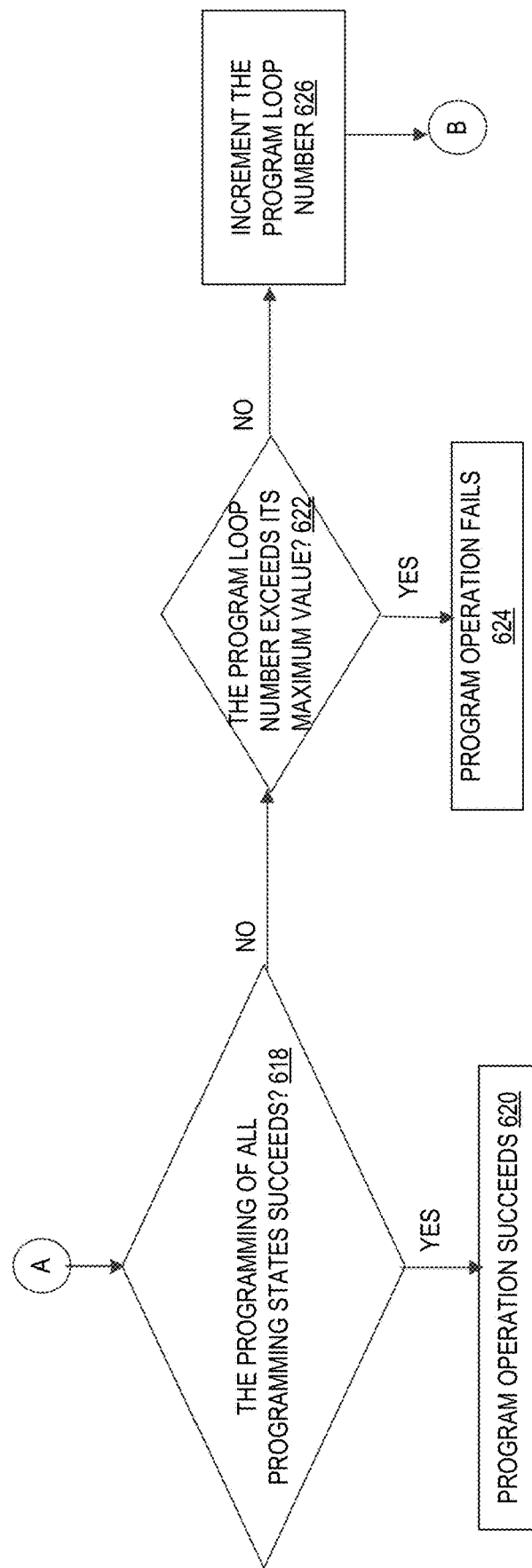

FIGS. 6C-6D illustrate a flowchart of a fourth method 630 for operating a memory device, according to some aspects of the present disclosure. Method 630 includes operations like those of method 600 in FIGS. 6A-6B, and the similar description will not be repeated herein. Additionally, method 630 includes additional operations 608 and 612 after operation 607. Method 630 can be another implementation of the IVS reduction scheme disclosed herein.

In method 630, after operation 607, method 630 may proceed to operation 608 to determine whether the current program loop number is equal to or greater than a predetermined program loop number (e.g., whether a predetermined number of program loops have been performed). Responsive to the current program loop number being equal to or greater than the predetermined program loop number (e.g., the predetermined number of program loops having been performed), method 630 proceeds to operation 613. Otherwise, method 630 proceeds to operation 612.

A value for the predetermined number of program loops (or the predetermined program loop number) can be determined based on the first predetermined programming state. For example, the higher the first predetermined programming state is, the larger the predetermined number of program loops is (or the larger the predetermined program loop number is). In a further example, with reference to FIG. 11 again, if the first predetermined programming state is P5, then the predetermined number of program loops can be 12

(e.g., at Pulse 12). If the first predetermined programming state is P6, then the predetermined number of program loops can be 13 (e.g., at Pulse 13).

At operation 613, similar to that of method 600, method 630 may continue to program the at least one first memory cell in one or more next program loops, where the at least one first memory cell has a threshold voltage newly becoming greater than the first verification voltage in the current program loop. As described below in more detail, the at least one first memory cell is a slow high-state memory cell.

At operation 612, method 630 may inhibit to program the at least one first memory cell in any next program loop. That is, the at least one first memory cell is locked out to prevent it from being programmed in any next program loop. As described below in more detail, the at least one first memory cell is a fast high-state memory cell. Method 630 may proceed to operation 615.

Consistent with some implementations of the present disclosure, when (or after) the current program loop number is equal to or greater than the predetermined program loop number, threshold voltages of some high-state memory cells newly become equal to or greater than their respective verification voltages. These high-state memory cells can be referred to as slow high-state memory cells. On the other hand, threshold voltages of some other high-state memory cells may newly become equal to or greater than their respective verification voltages when the current program loop number is smaller than the predetermined program loop number. These high-state memory cells can be referred to as fast high-state memory cells. The terms "slow" and "fast" are used here to refer to relative programming speeds of the high-state memory cells. For example, a slow high-state memory cell may be a high-state memory cell whose threshold voltage newly becomes equal to or greater than its corresponding verification voltage only when (or after) a predetermined number of program loops have been performed. A fast high-state memory cell may be a high-state memory cell whose threshold voltage newly becomes equal to or greater than its corresponding verification voltage before the predetermined number of program loops have been performed. Method 630 may continue to program the slow high-state memory cells even if their threshold voltages are equal to or greater than their respective verification voltages to reduce the IVS effect. The risk of over-programming for the slow high-state memory cells is low because the programming speed of these memory cells is relatively slow.

In some implementations, only part of the slow high-state memory cells are continued to be programmed in one or more next program loops after their threshold voltages are equal to or greater than their respective verification voltages. In some other implementations, all the high-state memory cells are continued to be programmed in one or more next program loops after their threshold voltages are equal to or greater than their respective verification voltages.

In some implementations, slow high-state memory cells having the same programming state are continued to be programmed together in one or more next program loops after the programming of the corresponding programming state is finished. For example, with reference to FIG. 11 again, the programming of the sixth programming state P6 is finished in the $15^{th}$ program loop (at Pulse 15). For high-state memory cells whose programming state is the sixth programming state P6, one or more programming voltages after Pulse 15 (e.g., Pulse 16, Pulse 17, or both) can be applied to continue to program these slow high-state memory cells.

In some other implementations, the slow high-state memory cells are continued to be programmed individually in one or more next program loops after their respective threshold voltages newly becomes equal to or greater than their respective verification voltages. Specifically, if a threshold voltage of a slow high-state memory cell newly becomes equal to or greater than its respective verification voltage in a program loop L (e.g., L is greater than the predetermined number of program loops), then the slow high-state memory cell is continued to be programmed using one or more programming voltages in one or more next program loops (e.g., Pulse (L+1) in the $(L+1)^{th}$ program loop, Pulse (L+2) in the $(L+2)^{th}$ program loop, etc.). For example, with reference to FIG. 11, assuming that a slow high-state memory cell has a programming state of P6, and a threshold voltage of the slow high-state memory cell newly becomes greater than its corresponding verification voltage at Pulse 15. Then, one or more programming voltages after Pulse 15 (e.g., Pulse 16, Pulse 17, etc.) are applied to continue programming the slow high-state memory cell.

Consistent with some implementations of the present disclosure, operation 613 of method 630 may be replaced by an operation to label the at least one first memory cell as "slow high-state memory cell," which can be reprogrammed later. For example, the at least one first memory cell may be reprogrammed with the same corresponding set of N-bits data after the current program pass completes (e.g., with respect to FIG. 11, after all the program pulses Pulse 1-Pulse 17 in the program pass are applied in the program operation). In some implementations, only part of the slow high-state memory cells are reprogrammed. In some other implementations, all the slow high-state memory cells are reprogrammed.

Figure 6E:
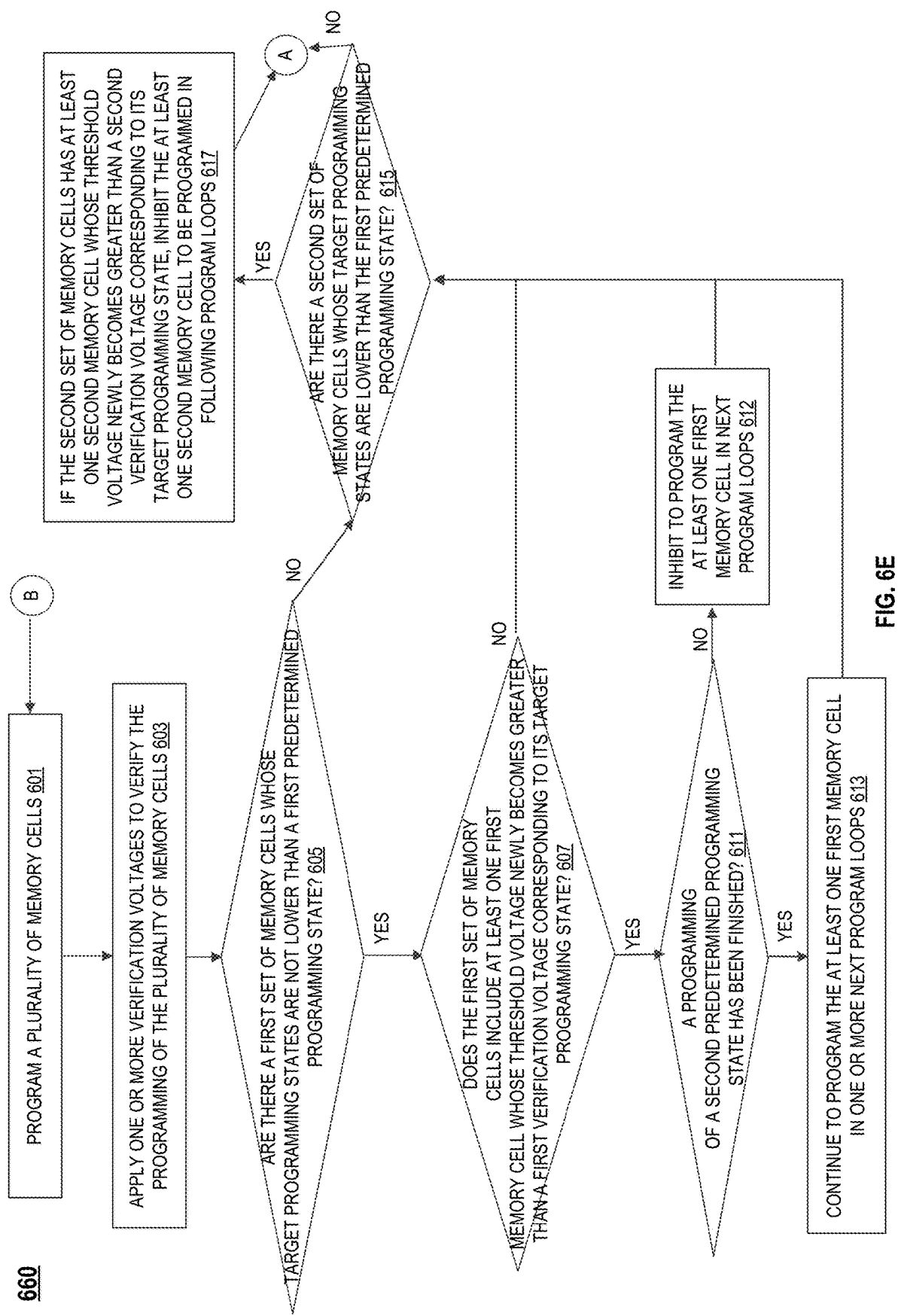
FIGS. 6E-6F illustrate a flowchart of a fifth method for operating a memory device, according to some aspects of the present disclosure.
Figure 6F:
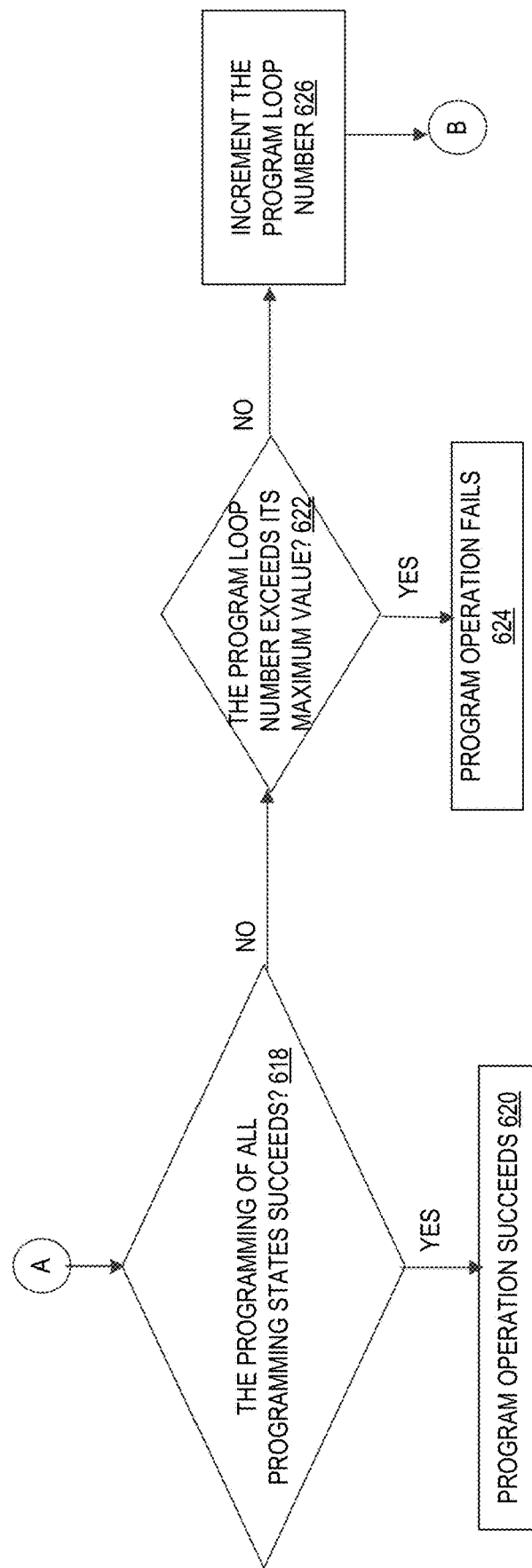

FIGS. 6E-6F illustrate a flowchart of a fifth method 660 for operating a memory device, according to some aspects of the present disclosure. Method 660 includes similar operations like those of method 600 in FIGS. 6A-6B or method 630 of FIGS. 6C-6D, and the similar description will not be repeated herein. Compared with method 630 in FIGS. 6C-6D, method 660 in FIGS. 6E-6F replaces operation 608 of FIG. 6C to operation 611 of FIG. 6E. Operation 608 of FIG. 6C and operation 611 of FIG. 6E are different ways to determine whether a high-state memory cell is a slow high-state memory cell or a fast high-state memory cell. Method 660 can also be an implementation of the IVS reduction scheme disclosed herein.

At operation 611, it is determined whether a programming of a second predetermined programming state (e.g., denoted as S2) has been finished. Responsive to the programming of the second predetermined programming state having been finished, method 660 proceeds to operation 613. Otherwise, method 660 proceeds to operation 612.

For example, with reference to FIG. 11 again, assuming that the second predetermined programming state is the fifth programming state (e.g., S2=P5). The programming of the fifth programming state begins at Pulse 1 (e.g., when the loop number is equal to 1) and is finished at Pulse 13 (e.g., when the loop number is equal to 13). That is, before Pulse 13, the programming of the fifth programming state P5 is not finished; and at Pulse 13, the programming of the fifth programming state P5 is finished. In another example, also with reference to FIG. 11, assuming that the second predetermined programming state is the sixth programming state (e.g., S2=P6). The programming of the sixth programming state P6 begins at Pulse 1 (e.g., when the loop number is equal to 1) and is finished at Pulse 15 (e.g., when the loop number is equal to 15).

In some implementations, the predetermined second programming state can be determined based on the first predetermined programming state. For example, the higher the first predetermined programming state is, the higher the second predetermined programming state is. In a further example, for QLCs, if the first predetermined programming state is P5, the second predetermined programming state can be the fourth programming state P4; and if the first predetermined programming state is P6, the second predetermined programming state can be the fifth programming state P5.

In some implementations, the second predetermined programming state S2 can be the same as the first predetermined programming state (e.g., denoted as S1). Alternatively, the second predetermined programming state can be different from the first predetermined programming state S1. It is assumed that when the programming of the second predetermined programming state has been finished, the programming of memory cells with programming states lower than the second predetermined programming state has also been finished, whereas the programming of memory cells with programming states higher than the second predetermined programming state may be finished or unfinished depending on the respective programming speeds of the memory cells.

Consistent with some implementations of the present disclosure, when (or after) the programming of the second predetermined programming state S2 is finished, threshold voltages of some high-state memory cells may newly become equal to or greater than their respective verification voltages. These high-state memory cells can also be referred to as slow high-state memory cells. On the other hand, threshold voltages of some other high-state memory cells may newly become equal to or greater than their respective verification voltage before the programming of the second predetermined programming state S2 is finished. These high-state memory cells can also be referred to as fast high-state memory cells. For example, if (1) a memory cell has a target programming state St not lower than the first predetermined programming state S1 but higher than the second predetermined programming state S2, and (2) the programming of the second predetermined programming state S2 is finished when the threshold voltage of the memory cell newly becomes greater than its corresponding verification voltage, then the memory cell can be referred to as a slow high-state memory cell. Like method 630 of FIGS. 6C-6D, method 660 of FIGS. 6E-6F may continue to program the slow high-state memory cell even if its threshold voltage is equal to or greater than its corresponding verification voltage to reduce the IVS effect.

Figure 7A:
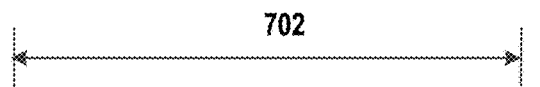
FIGS. 7A and 7B illustrate a waveform of word line voltages applied to a selected word line in a first program pass of a multi-pass program operation, according to some aspects of the present disclosure.
Figure 7A:
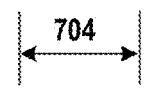
Figure 7A:
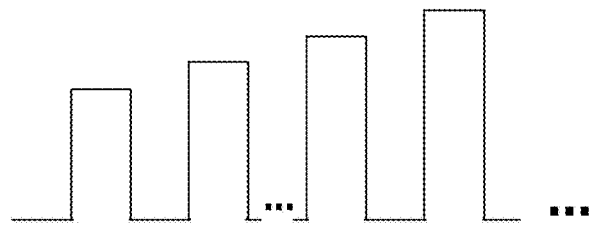
Figure 7B:
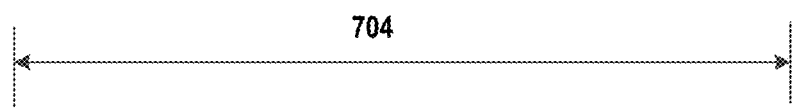
Figure 7B:
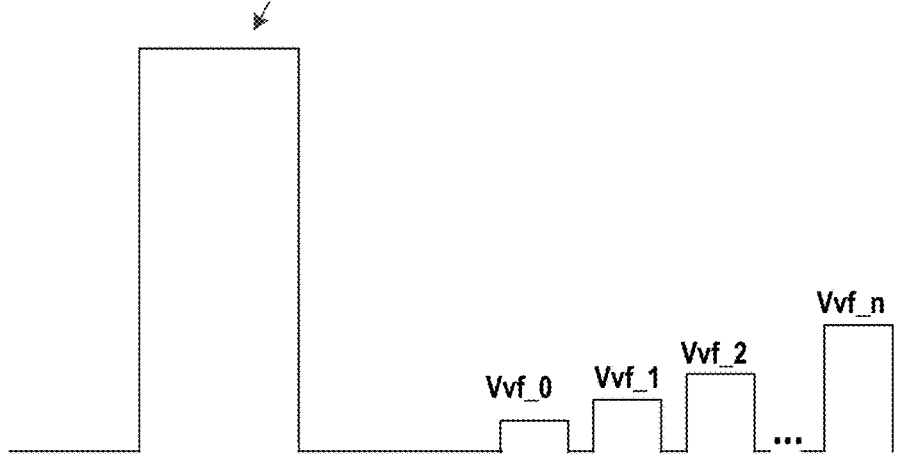

FIGS. 7A and 7B illustrate a waveform of word line voltages (e.g., program voltages) applied to a selected word line in a first program pass of a multi-pass program operation, according to some aspects of the present disclosure. In program operations, the data may be programmed (written) into xLCs, such as TLCs, QLCs, etc. For xLCs, for example, QLCs, multi-pass program operations can be used to reduce program time and increase read margin, which involves a coarse program pass that programs the xLCs to one of the intermediate levels, as well as a fine program pass that programs the xLCs from the intermediate levels to the final levels. For example, for QLCs, there are two schemes of two-pass program operations: an 8-16 scheme in which the memory cells are first programmed to 8 levels in the coarse programming, and then programmed to 16 levels in the fine programming; and a 16-16 scheme in which the memory cells are first programmed to 16 levels in the coarse programming, and then reprogrammed to form 16 levels with smaller threshold voltage ranges in the fine programming.

In a multi-pass program operation, in the fine program pass (e.g., the last program pass that programs each target memory cell 406 into a final level), each target memory cell 406 can be programmed into one of the $2^N$ levels based on the corresponding N bits of data to be stored in target memory cell 406. As to the coarse program pass (e.g., any non-last program pass that programs each target memory cell into an intermediate level), each target memory cell 406 is programmed into one of M levels (with $M \leq 2^n$ and $n \leq N$) based on the corresponding n bits of data to be stored in target memory cell 406. For example, for the 8-16 scheme described above, in the coarse program pass, each target memory cell 406 may be programmed into M=8 levels (where n=3<4), as opposed to 16 levels, based on 3 of the 4 bits of data to be stored in target memory cell 406. In other words, for the 8-16 scheme or any $2^n$-$2^N$ scheme, only n bits of N-bits data may be used to program target memory cells 406 in the coarse program pass (e.g., the non-last program pass). In another example, for the 16-16 scheme described above, in the coarse program pass, each target memory cell 406 may be programmed into 16 levels (where N=4), as opposed to 8 levels, based on all of the 4 bits of data to be stored in target memory cell 406. In other words, for the 16-16 scheme or any $2^N$-$2^N$ scheme, all bits of the N-bits data may be used to program target memory cells 406 in the coarse program pass (e.g., the non-last program pass).

To perform a program operation, in addition to page buffer/sense amplifier 504 providing to each target memory cell 406 the corresponding set of N-bits data, row decoder/word line driver 508 can be configured to apply program voltages and verify voltages to a selected word line 418 coupled to a row of target memory cells 406 in one or more program/verify loops in order to raise the threshold voltage of each target memory cell 406 to a desired level (into a desired range of threshold voltages) based on the corresponding set of N-bits data.

As shown in FIGS. 7A-7B, a multi-pass program operation includes at least a first program pass 702 (a.k.a., a coarse program pass, e.g., a non-last program pass). First program pass 702 includes one or more program/verify loops 704. A program/verify loop may be referred to as a program loop herein for simplicity. As shown in FIG. 7B, in each program/verify loop 704, a program voltage (Vpgm) is applied to the selected word line, followed by a number of verify voltages (Vvf_0, Vvf_1, . . . ) with incremental changes of voltage levels.

Figure 7C:
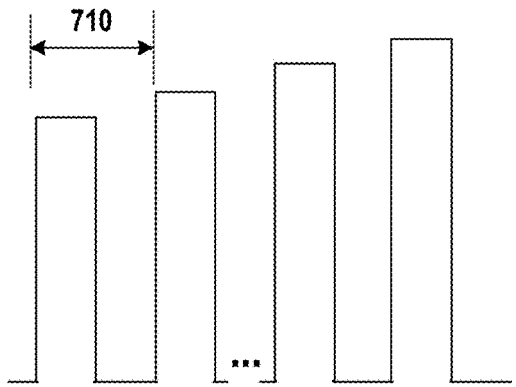
FIGS. 7C and 7D illustrate a waveform of word line voltages applied to a selected word line in a second program pass of a multi-pass program operation, according to some aspects of the present disclosure.
Figure 7D:
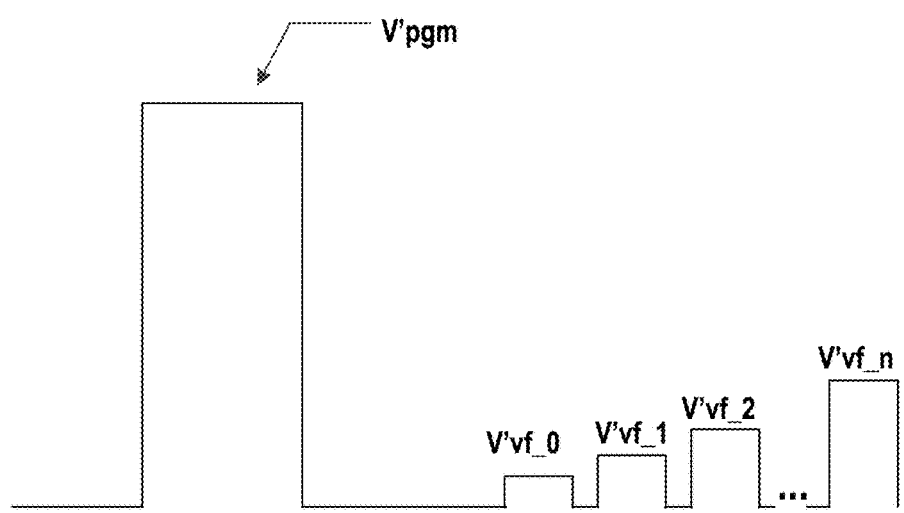

FIGS. 7C and 7D illustrate a waveform of word line voltages (e.g., program voltages) applied to a selected word line in a second program pass of a multi-pass program operation, according to some aspects of the present disclosure. As shown in FIGS. 7C-7D, the multi-pass program operation further includes a second program pass 708 (a.k.a., a fine program pass, e.g., a last program pass). Second program pass 708 may be performed after first program pass 704. Second program pass 708 includes one or more program/verify loops 710. As shown in FIG. 7D, in each program/verify loop 710, a program voltage (V'pgm) is applied to the selected word line, followed by a number of verify voltages (V'vf_0, V'vf_1, . . . ) with incremental changes of voltage levels.

Figure 7E:
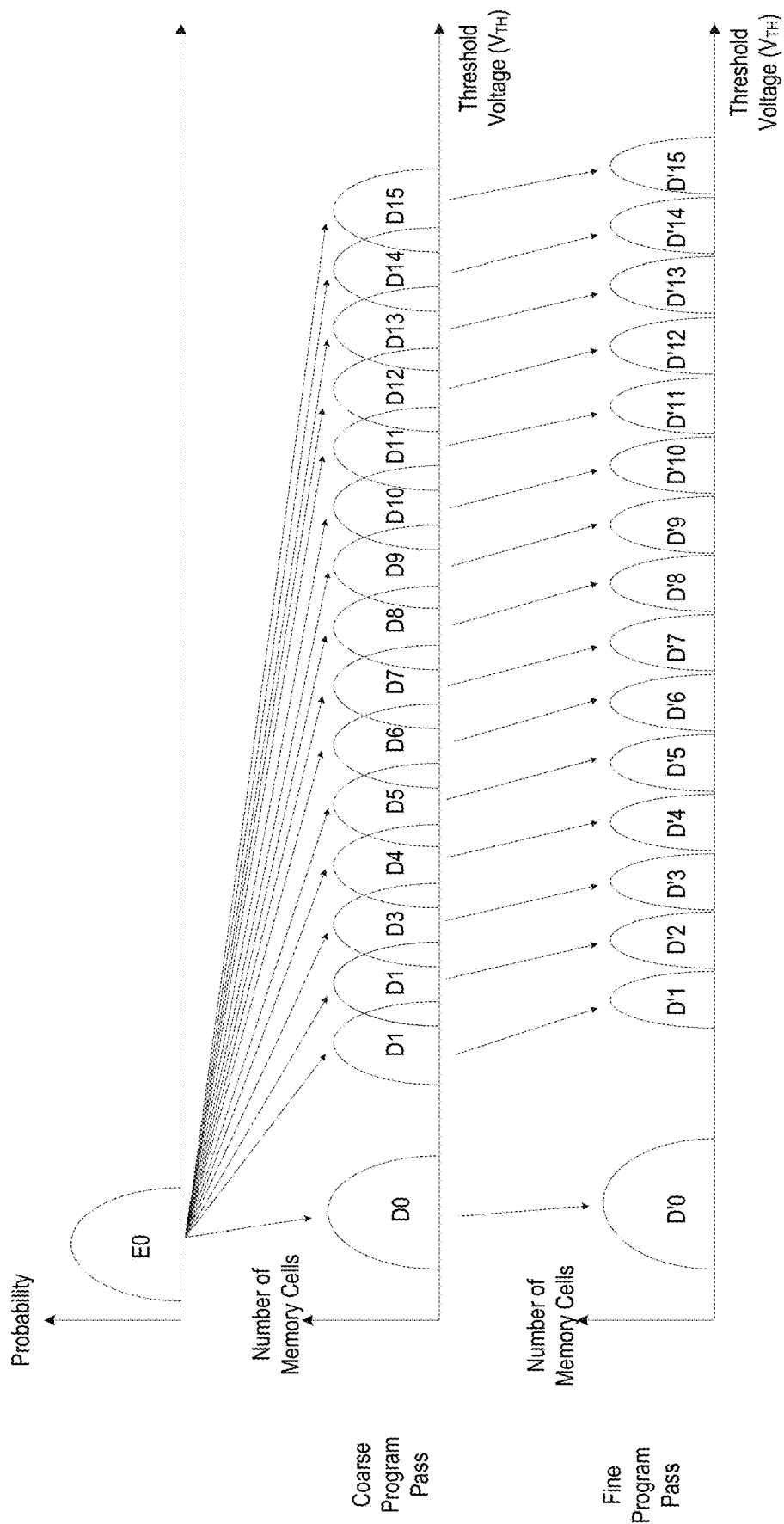
FIG. 7E illustrates threshold voltage distributions of memory cells in a multi-pass program operation according to some examples.

Still taking QLCs, where N=4, for example, as shown in FIG. 7E, memory cells are first programmed into one of 16 intermediate levels in first program pass 702 (e.g., coarse program pass) by applying 15 verify voltages each between two adjacent intermediate levels. D0 may represent a threshold-voltage distribution of the erased state (E0). D1, D2, . . . , D15 may represent threshold-voltage distributions of the programming states P1, P2, . . . , P15, respectively. In second program pass 708 (e.g., fine program pass), by applying a larger program voltage, the threshold voltages of the memory cells in each level (e.g., in the programming state) are shifted up to a respective final level with a reduced width of the threshold voltage distribution (i.e., a narrower range). D'0 may represent a threshold-voltage distribution of the erased state (E0). D'1, D'2, . . . , D'15 may represent threshold-voltage distributions of the programming states P1, P2, . . . , P15, respectively.

Figure 8:
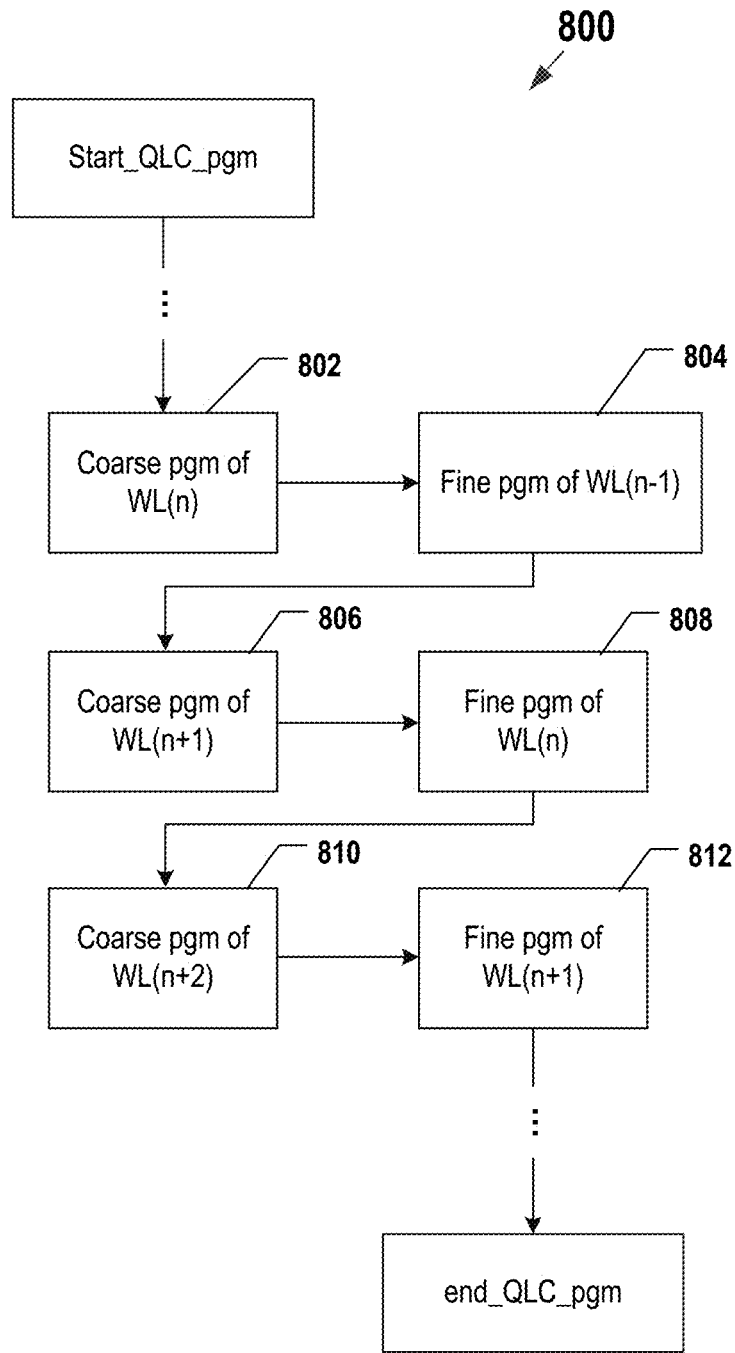
FIG. 8 illustrates a process for performing multi-pass program operations in a memory device according to some examples.

FIG. 8 illustrates a process 800 for performing multi-pass program operations in a memory device according to some examples. The memory device can be any suitable memory device disclosed herein, e.g., memory system 100 of FIG. 1 or memory device 400 of FIG. 4. Process 800 may be executed by a control circuit (e.g., control circuit 110 of FIG. 1 or control logic 512 of FIG. 5A). The multi-pass program operations may be performed with respect to a plurality of word lines (e.g., WL(n−1), WL(n), WL(n+1)), respectively.

Taking QLCs for example, a coarse program pass and a fine program pass may be performed with respect to each word line. For example, the control circuit may perform a coarse program pass 802 associated with the word line WL(n). Prior to performing coarse program pass 802, a coarse program pass associated with the word line WL(n−1) (not shown in FIG. 8) can be performed. Next, the control circuit may sequentially perform a fine program pass 804 associated with the word line WL(n−1), a coarse program pass 806 associated with the word line WL(n+1), a fine program pass 808 associated with the word line WL(n), a coarse program pass 810 associated with the word line WL(n+2), and a fine program pass 812 associated with the word line WL(n+1), and so on and so forth.

Consistent with some aspects of the present disclosure, a memory device disclosed herein may include a plurality of memory cells and a control circuit. The plurality of memory cells may include a first set of memory cells (e.g., a first set of high-state memory cells) configured to be programmed into a first set of programming states each of which is not lower than a first predetermined programming state. Initially, the control circuit may be configured to perform a first program pass on the first set of memory cells.

For example, as shown in FIGS. 7A and 7B, in each program loop 704 of the first program pass, a corresponding program voltage can be applied to a first word line associated with the first set of memory cells (e.g., row decoder/word line driver 508 may apply a program voltage to the first word line coupled to the first set of memory cells). For each memory cell in the first set of memory cells, a corresponding set of N-bits data to be stored on the memory cell can be provided to the memory cell through a respective bit line (e.g., page buffer/sense amplifier 504 may provide a corresponding set of N-bits data to each memory cell). Then, one or more verification voltages (or verify voltages) corresponding to the program loop can be applied sequentially to the first word line to verify whether threshold voltages of the first set of memory cells are greater than the one or more verification voltages, respectively.

In some implementations, the control circuit may continue to program at least a first memory cell from the first set of memory cells with one or more first programming voltages, where a threshold voltage of the first memory cell is greater than a first verification voltage that corresponds to a first programming state of the first memory cell. For example, the first memory cell can be any memory cell (e.g., any high-state memory cell) from the first set of memory cells. It is contemplated that the control circuit may continue to program part of or all of the high-state memory cells in the first set of memory cells with one or more additional programming voltages, which is not limited herein. In another example, the first memory cell can be a slow high-state memory cell (e.g., not a fast high-state memory cell) from the first set of memory cells. It is contemplated that the control circuit may continue to program part of or all of the slow high-state memory cells from the first set of memory cells with one or more additional programming voltages, which is not limited herein.

Figure 9:
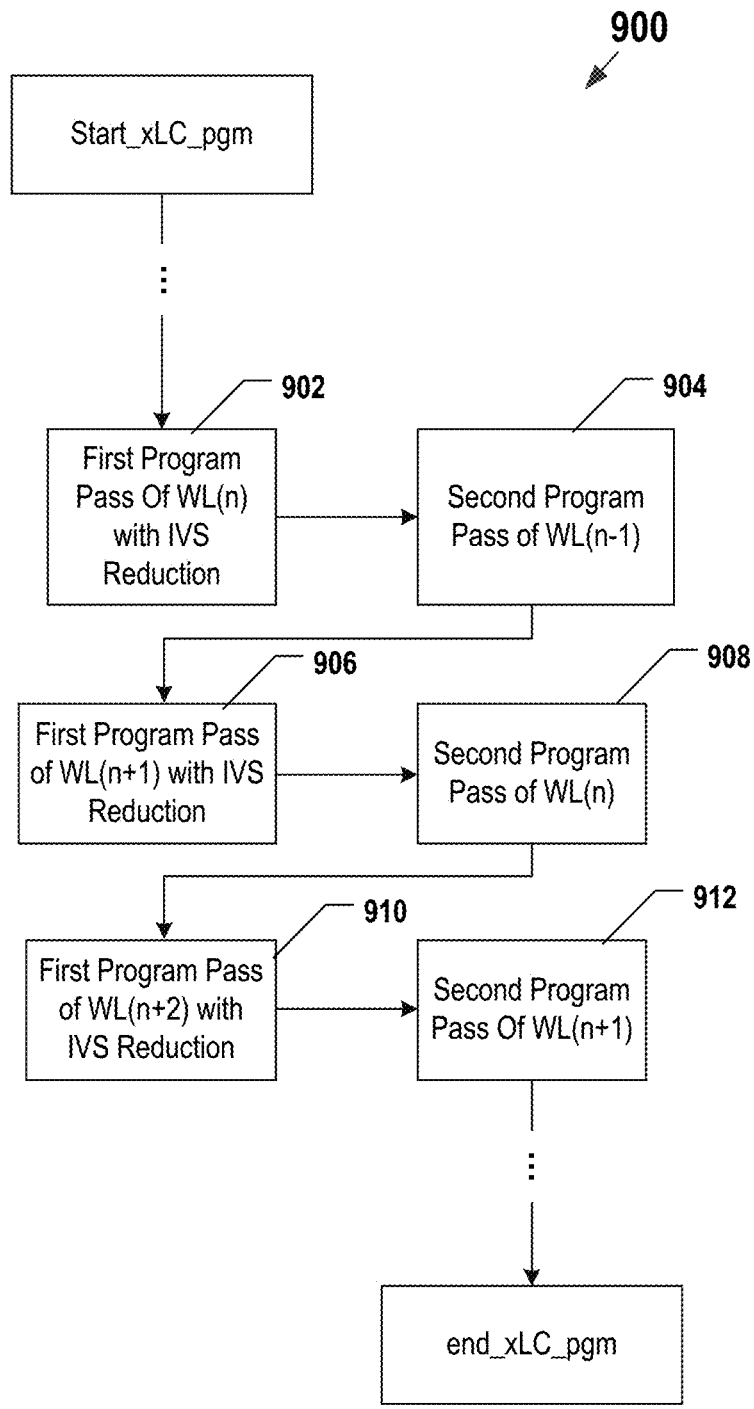
FIG. 9 illustrates a first process for performing multi-pass program operations in a memory device, according to some aspects of the present disclosure.
Figure 10A:
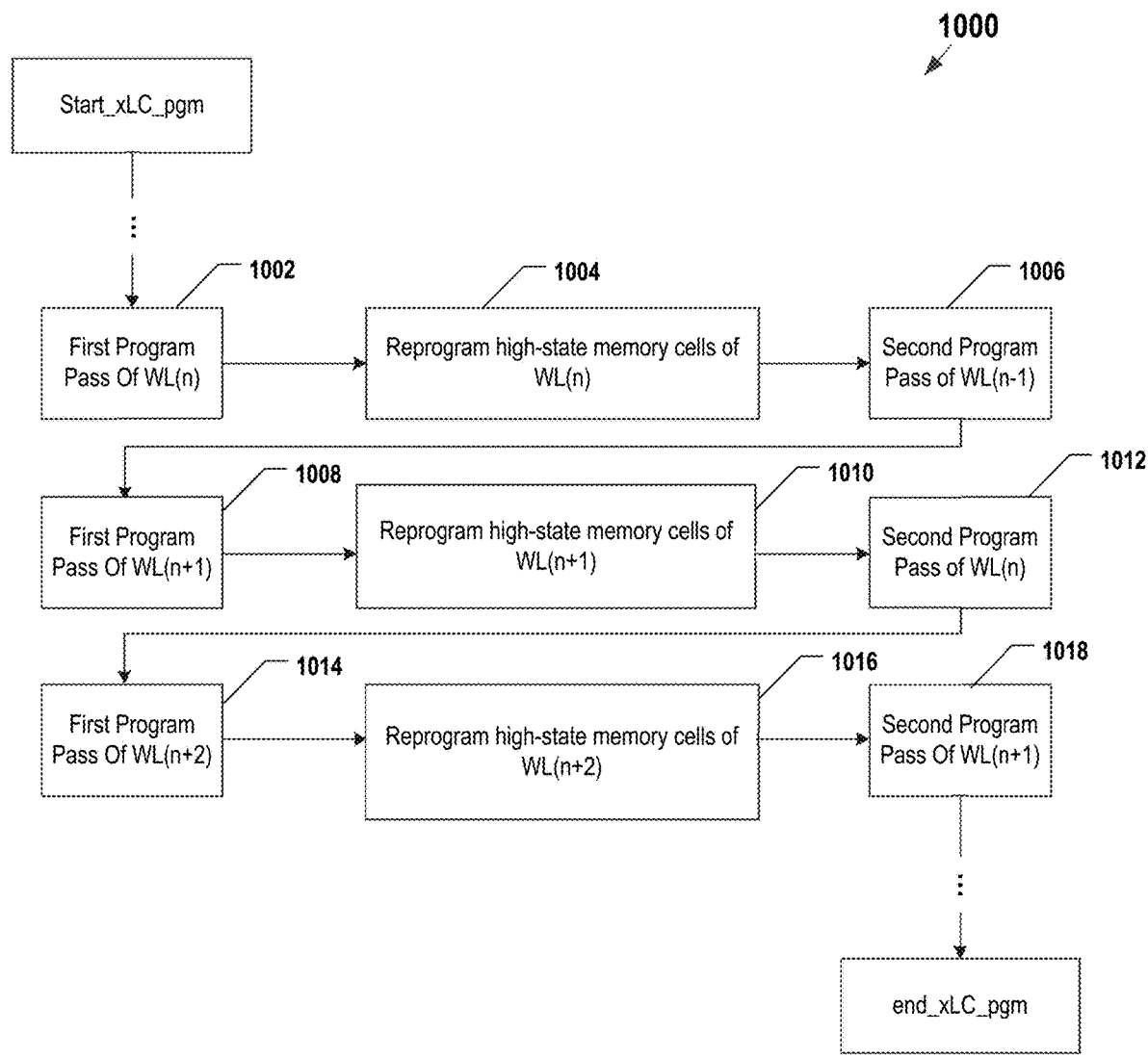
FIG. 10A illustrates a second process for performing multi-pass program operations in a memory device, according to some aspects of the present disclosure.
Figure 10B:
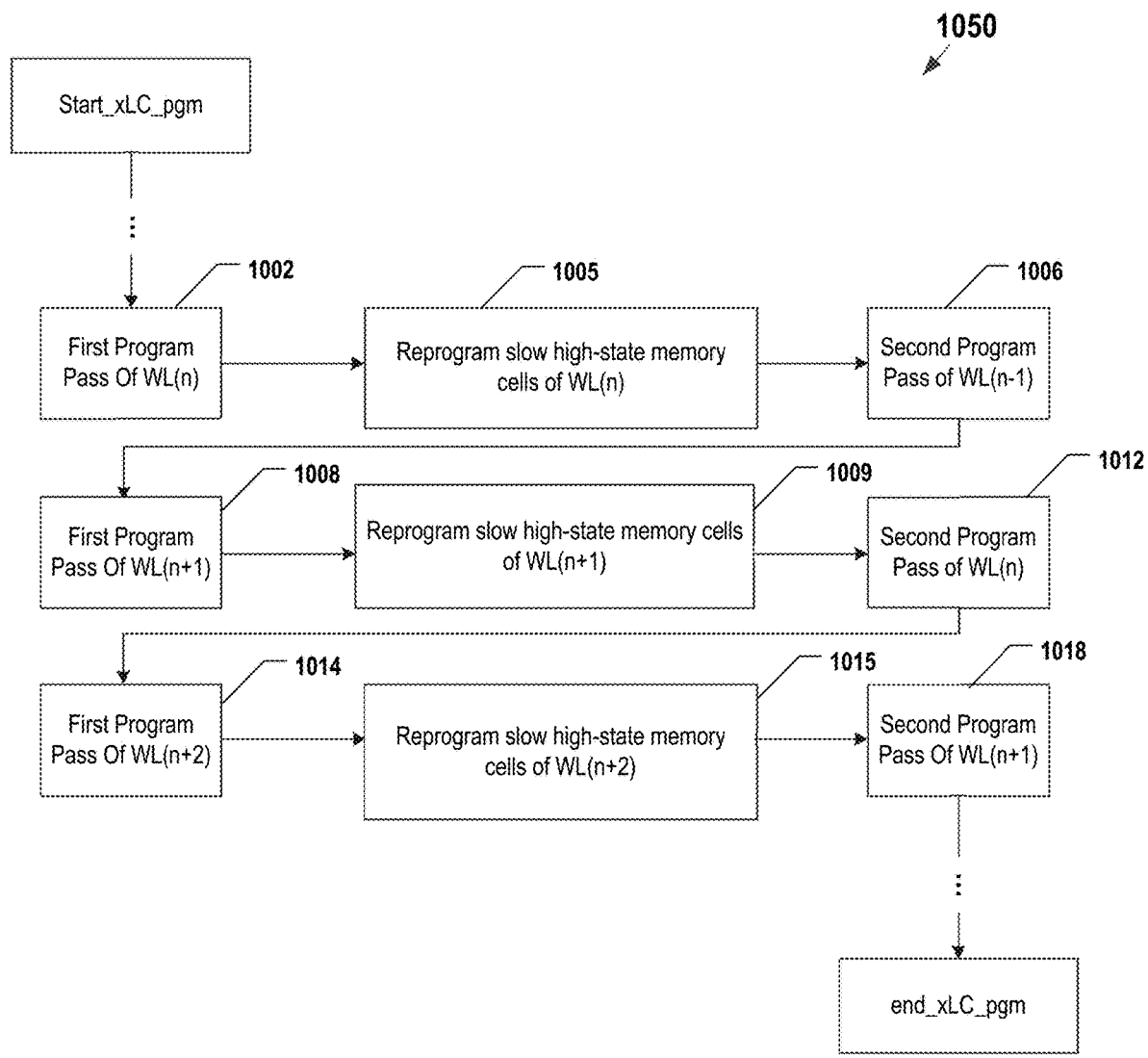
FIG. 10B illustrates a third process for performing multi-pass program operations in a memory device, according to some aspects of the present disclosure.

For example, as shown in FIG. 9 below, the control circuit is further configured to continue to program at least the first memory cell with one or more first programming voltages in the first program pass (e.g., in the coarse program pass) associated with the first word line, which is described below in more detail. In another example, as shown in FIGS. 10A-10B below, the control circuit is further configured to reprogram at least the first memory cell in an intermediate program pass between the first program pass and a second program pass associated with the first word line, which is described below in more detail.

Subsequently, the control circuit may be configured to perform the second program pass on the first set of memory cells. For example, as shown in FIGS. 7C and 7D, in each program loop 708 of the second program pass, a corresponding program voltage can be applied to the first word line. For each memory cell in the first set of memory cells, a corresponding set of N-bits data to be stored on the memory cell can be provided to the memory cell through a respective bit line (e.g., page buffer/sense amplifier 504 may provide a corresponding set of N-bits data to each memory cell). Then, one or more verification voltages (or verify voltages) corresponding to the program loop can be applied sequentially to the first word line to verify whether threshold voltages of the first set of memory cells are greater than the one or more verification voltages, respectively.

FIG. 9 illustrates a first process 900 for performing multi-pass program operations in a memory device, according to some aspects of the present disclosure. The memory device can be any suitable memory device disclosed herein, e.g., memory system 100 of FIG. 1 or memory device 400 of FIG. 4. Process 900 may be executed by a control circuit (e.g., control circuit 110 of FIG. 1 or control logic 512 of FIG. 5A). Like FIG. 8, the multi-pass program operations may be performed with respect to a plurality of word lines (e.g., WL(n−1), WL(n), WL(n+1)), respectively.

Taking xLCs (e.g., QLCs) for example, a first program pass (e.g., a coarse program pass) and a second program pass (e.g., a fine program pass) may be performed with respect to each word line. For example, the control circuit may perform a first program pass 902 associated with the word line WL(n). Prior to performing first program pass 902, the control circuit may perform a first program pass associated with the word line WL(n−1) (not shown in FIG. 9). After performing first program pass 902 associated with the word line WL(n), the control circuit may sequentially perform a second program pass 904 associated with the word line WL(n−1), a first program pass 906 associated with the word line WL(n+1), a second program pass 908 associated with the word line WL(n), a first program pass 910 associated with the word line WL(n+2), and a second program pass 912 associated with the word line WL(n+1), and so on and so forth. Different from coarse program pass 802, 806, or 810 of FIG. 8, an IVS reduction scheme (e.g., method 200 of FIG. 2, method 300 of FIG. 3, method 600 of FIGS. 6A-6B, method 630 of FIGS. 6C-6D, or method 660 of FIGS. 6E-6F) is applied in each first program pass 902, 906, or 910 of FIG. 9.

A first implementation of the IVS reduction scheme is described herein with reference to FIG. 9. Specifically, assuming that a first set of memory cells can be coupled to the word line WL(n). The first set of memory cells can be a first set of high-state memory cells (e.g., configured to be programmed into a first set of programming states each of which is not lower than the first predetermined programming state). A second set of memory cells may be coupled to a word line WL(n+1), a third set of memory cells may be coupled to a word line WL(n+2), and a fourth set of memory cells may be coupled to a word line WL(n−1). The second set of memory cells can be a second set of high-state memory cells (e.g., configured to be programmed into a second set of programming states each of which is not lower than the first predetermined programming state). The third set of memory cells can be a third set of high-state memory cells (e.g., configured to be programmed into a third set of programming states each of which is not lower than the first predetermined programming state).

The control circuit may be configured to: perform first program pass 902 on the first set of memory cells coupled to the word line WL(n); perform second program pass 904 on the fourth set of memory cells coupled to the word line WL(n−1); perform first program pass 906 on the second set of memory cells coupled to the word line WL(n+1); perform second program pass 908 on the first set of memory cells coupled to the word line WL(n); perform first program pass 910 on the third set of memory cells coupled to the word line WL(n+2); and perform second program pass 912 on the second set of memory cells coupled to the word line WL(n+1).

The control circuit may be further configured to continue to program at least a first memory cell from the first set of memory cells with one or more first programming voltages in first program pass 902 performed on the first set of memory cells coupled to the word line WL(n). The first memory cell is configured to be programmed into a first programming state which is not lower than the first predetermined programming state and corresponds to a first verification voltage.

In a first example, the first memory cell can be a high-state memory cell from the first set of memory cells. The control circuit may perform operations like those described above with reference to operation 613 of FIG. 6A to continue programming the first memory cell with one or more first programming voltages. For instance, a threshold voltage of the first memory cell newly becomes greater than the first verification voltage in a current program loop of first program pass 902 (e.g., the threshold voltage of the first memory cell is smaller than the first verification voltage in the previous program loops of first program pass 902, and becomes greater than the first verification voltage in the current program loop of first program pass 902). Then, the control circuit may be configured to apply one or more program pulses in one or more following program loops after the current program loop to further program the first memory cell in the one or more following program loops, respectively.

In a second example, the first memory cell can be a slow high-state memory cell from the first set of memory cells. For instance, the control circuit may determine that a predetermined number of program loops have been performed when the threshold voltage of the first memory cell newly becomes greater than the first verification voltage. The control circuit may select the first memory cell from the first set of memory cells (as a slow high-state memory cell) and continue to program the first memory cell with one or more first programming voltages. In another instance, the control circuit may determine that the programming of a second predetermined programming state has been finished when the threshold voltage of the first memory cell newly becomes greater than the first verification voltage. The control circuit may select the first memory cell from the first set of memory cells (as a slow high-state memory cell) and continue to program the first memory cell with the one or more first programming voltages. In either instance, the control circuit may perform operations like those described above with reference to operation 613 of FIG. 6A, 6C, or 6E to continue programming the first memory cell with one or more first programming voltages. For example, when the predetermined number of program loops have been performed (see FIG. 6C) or when the programing of the second predetermined programming state is already finished (see FIG. 6E), a threshold voltage of the first memory cell newly becomes greater than the first verification voltage in a current program loop of first program pass 902. Then, the control circuit may be configured to apply one or more program pulses in one or more following program loops after the current program loop to further program the first memory cell in the one or more following program loops, respectively.

Similarly, the control circuit may be further configured to: continue to program at least a second memory cell from the second set of memory cells with one or more second programming voltages in first program pass 906 performed on the second set of memory cells coupled to the word line WL(n+1); and continue to program at least a third memory cell from the third set of memory cells with one or more third programming voltages in first program pass 910 performed on the third set of memory cells coupled to the word line WL(n+2). The similar description will not be repeated herein.

FIG. 10A illustrates a second process 1000 for performing multi-pass program operations in a memory device, according to some aspects of the present disclosure. The memory device can be any suitable memory device disclosed herein, e.g., memory system 100 of FIG. 1 or memory device 400 of FIG. 4. Process 1000 may be executed by a control circuit (e.g., control circuit 110 of FIG. 1 or control logic 512 of FIG. 5A). Like FIG. 8 or FIG. 9, the multi-pass program operations may be performed with respect to a plurality of word lines (e.g., WL(n−1), WL(n), WL(n+1)), respectively.

Taking xLCs (e.g., QLCs) for example, a first program pass (e.g., a coarse program pass) and a second program pass (e.g., a fine program pass) may be performed with respect to each word line. For example, the control circuit may perform a first program pass 1002 associated with the word line WL(n). Prior to performing first program pass 1002 associated with the word line WL(n), a first program pass associated with the word line WL(n−1) (not shown in FIG. 10) can be performed. Next, the control circuit may perform a second program pass 1006 associated with the word line WL(n−1), a first program pass 1008 associated with the word line WL(n+1), a second program pass 1012 associated with the word line WL(n), a first program pass 1014 associated with the word line WL(n+2), and a second program pass 1018 associated with the word line WL(n+1), and so on and so forth.

Different from FIG. 8, an IVS reduction scheme is applied after each first program pass 1002, 1008, or 1014 of FIG. 10A. For example, an intermediate program pass 1004 is applied after first program pass 1002 to reprogram at least part of or all of the memory cells of WL(n) whose programming states are not lower than the first predetermined programming state (e.g., at least part of or all of the high-state memory cells of WL(n)). Similarly, an intermediate program pass 1010 is applied after first program pass 1008 to reprogram at least part of or all of the high-state memory cells of WL(n+1). An intermediate program pass 1016 is applied after first program pass 1014 to reprogram at least part of or all of the high-state memory cells of WL(n+2).

In some implementations, the control circuit is further configured to perform intermediate program pass 1004, 1010, or 1016 in response to receiving a reprogramming instruction from a memory controller. A memory controller is described below in more detail with reference to FIGS. 16-17.

A second implementation of the IVS reduction scheme is described herein with reference to FIG. 10A. Specifically, assuming that a first set of memory cells can be coupled to the word line WL(n). The first set of memory cells can be a first set of high-state memory cells (e.g., configured to be programmed into a first set of programming states each of which is not lower than the first predetermined programming state). A second set of memory cells may be coupled to a word line WL(n+1), a third set of memory cells may be coupled to a word line WL(n+2), and a fourth set of memory cells may be coupled to a word line WL(n-1). The second set of memory cells can be a second set of high-state memory cells (e.g., configured to be programmed into a second set of programming states each of which is not lower than the first predetermined programming state). The third set of memory cells can be a third set of high-state memory cells (e.g., configured to be programmed into a third set of programming states each of which is not lower than the first predetermined programming state).

The control circuit may be configured to: perform first program pass 1002 on the first set of memory cells coupled to the word line WL(n); perform second program pass 1006 on the fourth set of memory cells coupled to the word line WL(n-1); perform first program pass 1008 on the second set of memory cells coupled to the word line WL(n+1); perform second program pass 1012 on the first set of memory cells coupled to the word line WL(n); perform first program pass 1014 on the third set of memory cells coupled to the word line WL(n+2); and perform second program pass 1018 on the second set of memory cells coupled to the word line WL(n+1).

In response to receiving a reprogramming instruction from a memory controller, the control circuit is configured to reprogram at least a first memory cell (e.g., at least a high-state memory cell) from the first set of memory cells in an intermediate program pass 1004 between first program pass 1002 and second program pass 1012 performed on the first set of memory cells coupled to the word line WL(n). In some implementations, intermediate program pass 1004 can be performed at any time point between first program pass 1002 and second program pass 1012 (e.g., any time point after first program pass 1002 but prior to second program pass 1012 of the word line WL(n)). For example, intermediate program pass 1004 can be performed between first program pass 1002 of the word line WL(n) and second program pass 1006 of the word line WL(n-1), as shown in FIG. 10A. In another example, intermediate program pass 1004 can be performed between second program pass 1006 of the word line WL(n-1) and first program pass 1008 of the word line WL(n+1). In yet another example, intermediate program pass 1004 can be performed between first program pass 1008 of the word line WL(n+1) and second program pass 1012 of the word line WL(n).

Similarly, the control circuit may be further configured to reprogram at least a second memory cell from the second set of memory cells in an intermediate program pass 1010 between first program pass 1008 and second program pass 1018 performed on the second set of memory cells coupled to the word line WL(n+1). Further, the control circuit may be configured to reprogram at least a third memory cell from the third set of memory cells in an intermediate program pass 1016 between first program pass 1014 and a second program pass performed on the third set of memory cells coupled to the word line WL(n+2).

FIG. 10B illustrates a third process 1050 for performing multi-pass program operations in a memory device, according to some aspects of the present disclosure. FIG. 10B may include operations like those of FIG. 10A, and the similar description will not be repeated herein. In some implementations, an intermediate program pass 1005 is applied after first program pass 1002 to reprogram at least part of or all of the slow high-state memory cells of the word line WL(n). For example, the slow high-state memory cells of the word line WL(n) can be high-state memory cells coupled to the word line WL(n) whose threshold voltages newly becomes greater than their corresponding verification voltages when (or after) a predetermined number of program loops have been performed. In another example, the slow high-state memory cells of the word line WL(n) can be high-state memory cells coupled to the word line WL(n) whose threshold voltages newly becomes greater than their corresponding verification voltages when (or after) the programming of the second predetermined programming state is finished.

In some implementations, intermediate program pass 1005 can be performed at any time point between first program pass 1002 and second program pass 1012 (e.g., any time point after first program pass 1002 but prior to second program pass 1012 of the word line WL(n)). For example, intermediate program pass 1005 can be performed between first program pass 1002 of the word line WL(n) and second program pass 1006 of the word line WL(n-1), as shown in FIG. 10B. In another example, intermediate program pass 1005 can be performed between second program pass 1006 of the word line WL(n-1) and first program pass 1008 of the word line WL(n+1). In yet another example, intermediate program pass 1005 can be performed between first program pass 1008 of the word line (n+1) and second program pass 1012 of the word line WL(n).

Similarly, an intermediate program pass 1009 is applied after first program pass 1008 to reprogram at least part of or all of the slow high-state memory cells of WL(n+1). An intermediate program pass 1015 is applied after first program pass 1014 to reprogram at least part of or all of the slow high-state memory cells of WL(n+2).

In some implementations, the control circuit is further configured to perform intermediate program pass 1005, 1009, or 1015 in response to receiving a reprogramming instruction from a memory controller.

FIG. 11 illustrates a table (TABLE 2) listing program pulses, programming states, and verification voltages (or verify levels) applied in a program operation (e.g., a first program pass of a multi-pass program operation), according to some aspects of the present disclosure. TABLE 2 of FIG. 11 can be used to program TLCs. To begin with the program operation (or the first program pass of the multi-pass program operation) on a set of memory cells coupled to a word line, in a $1^{st}$ program loop, a $1^{st}$ program pulse (Pulse 1) can be applied to the word line to program the set of memory cells, where each memory cell is configured to be programmed into a respective one of the programming states P1-P7. Then, a verification voltage (e.g., a verify level corresponding to the first programming state P1) can be applied to verify whether memory cells that are configured to be programmed into the programming state P1 pass a P1 verification test. The P1 verification test can be a verification test using the verification voltage corresponding to the programming state P1.

Next, in a $2^{nd}$ program loop, a $2^{nd}$ program pulse (Pulse 2) can be applied to the word line to program (1) memory cells that are configured to be programmed into programming states P2-P7 and (2) memory cells that are configured to be programmed into the programming state P1 but have not passed the P1 verification test in the $1^{st}$ program loop. The verification voltage corresponding to P1 can be applied to verify whether the memory cells (which are configured to be programmed into the programming state P1 but have not passed the P1 verification test in the $1^{st}$ program loop) pass the P1 verification test in the $2^{nd}$ program loop.

In a $3^{rd}$ program loop, a verification voltage corresponding to the second programming state P2 is started to be used in a P2 verification test using a verification voltage corresponding to P2. For example, a $3^{rd}$ program pulse can be applied to the word line to program (1) memory cells that are configured to be programmed into programming states P2-P7 and (2) memory cells that are configured to be programmed into the programming state P1 but have not passed the P1 verification test in the $1^{st}$ and $2^{nd}$ program loops. The verification voltage corresponding to P1 can be applied to verify whether the memory cells (which are configured to be programmed into the programming state P1 but have not passed the P1 verification test in the $1^{st}$ and $2^{nd}$ program loops) pass the P1 verification test in the $3^{rd}$ program loop. Another verification voltage corresponding to P2 can be applied to verify whether memory cells that are configured to be programmed into the programming state P2 pass the P2 verification test using the verification voltage corresponding to P2. Similar operations can be performed in other program loops (e.g., the $4^{th}$ program loop to the $17^{th}$ program loop), and the similar description will not be repeated herein.

A third implementation of the IVS reduction scheme disclosed herein is provided herein. In a first example with reference to FIGS. 6A-6B and FIG. 11, assuming that the first predetermined programming state is P6. The control circuit may continue to program memory cells (high-state memory cells) which are configured to be programmed into a programming state P6 or P7 after the memory cells pass their respective verification tests using their respective verification voltages. In TABLE 2 of FIG. 11, the programming of the programming state P6 is verified between the $11^{th}$ program loop (when the $11^{th}$ program pulse is applied) and the $15^{th}$ program loop (when the $15^{th}$ program pulse is applied). If a memory cell configured to be programmed into the programming state P6 just passes the verification test with the verify level corresponding to P6 in the $L^{th}$ program loop ($11 \le L \le 15$), the control circuit may continue to program the memory cell in the $(L+1)^{th}$ program loop using the $(L+1)^{th}$ program pulse. Further, the programming of the programming state P7 is verified between the $13^{th}$ program loop (when the $13^{th}$ program pulse is applied) and the $17^{th}$ program loop (when the $17^{th}$ program pulse is applied). If a memory cell configured to be programmed into the programming state P7 just passes the verification test with the verify level corresponding to P7 in the $L'^{th}$ program loop ($13 \le L' \le 17$), the control circuit may continue to program the memory cell in the $(L'+1)^{th}$ program loop using the $(L'+1)^{th}$ program pulse.

In a second example (e.g., with reference to FIGS. 6C-6D and FIG. 11), assuming that the first predetermined programming state is the sixth programming state P6, and the predetermined program loop number is set to be 15 (e.g., Lmax_num=15). Both a first memory cell and a second memory cell are high-state memory cells configured to be programmed into the programming state P6. Both a third memory cell and a fourth memory cell are also high-state memory cells configured to be programmed into the programming state P7. If the first memory cell passes the verification test with the verify level corresponding to P6 in the $15^{th}$ program loop (which is equal to the predetermined program loop number Lmax_num), the first memory cell is a slow high-state memory cell. The control circuit may continue to program the first memory cell in the $16^{th}$ program loop using the $16^{th}$ program pulse. If the second memory cell passes the verification test with the verify level corresponding to P6 in the $14^{th}$ program loop (which is smaller than the predetermined program loop number Lmax_num), the second memory cell is a fast high-state memory cell. The control circuit may inhibit the programming of the second memory cell in the following program loops. Similarly, if the third memory cell passes the verification test with the verify level corresponding to P7 in the $15^{th}$ program loop (which is equal to the predetermined program loop number Lmax_num), the third memory cell is a slow high-state memory cell. The control circuit may continue to program the third memory cell in the $16^{th}$ program loop using the $16^{th}$ program pulse. If the fourth memory cell passes the verification test with the verify level corresponding to P7 in the $14^{th}$ program loop (which is smaller than the predetermined program loop number Lmax_num), the fourth memory cell is a fast high-state memory cell. The control circuit may inhibit the programming of the fourth memory cell in the following program loops.

In third example with reference to FIGS. 6E-6F and FIG. 11, assuming that the second predetermined programming state S2 is set to be P6 (e.g., S2=6). Both a first memory cell and a second memory cell are configured to be programmed into the programming state P7 (e.g., both the first and second memory cells are high-state memory cells). The programming of the second predetermined programming state S2=P6 finishes in the $15^{th}$ program loop. If the first memory cell passes the verification test with the verify level corresponding to P7 in the $16^{th}$ program loop (e.g., after the programming of P6 has been finished), the first memory cell is a slow high-state memory cell. The control circuit may continue to program the first memory cell in the $17^{th}$ program loop using the $17^{th}$ program pulse. If the second memory cell passes the verification test with the verify level corresponding to P6 in the $14^{th}$ program loop (e.g., before the programming of P6 is finished), the second memory cell is a fast high-state memory cell. The control circuit may inhibit the programming of the second memory cell in the following program loops.

A fourth implementation of the IVS reduction scheme disclosed herein is provided herein with reference to FIGS. 10A-10B and FIG. 11. Assuming that the first predetermined programming state is P6. The control circuit may continue to program part of or all of the high-state memory cells which are configured to be programmed into the programming state P6 or P7 by reprogramming the corresponding high-state memory cells in an intermediate program pass. For example, after the application of the $17^{th}$ program pulse of TABLE 2 in FIG. 11, the control circuit may receive a reprogramming instruction from a memory controller to reprogram the high-state memory cells. Responsive to receiving the reprogramming instruction, the control circuit may reprogram at least part of or all of the high-state memory cells using one or more program pulses from the $11^{th}$ program pulse to the $17^{th}$ program pulse. In another example, after the application of the $17^{th}$ program pulse of TABLE 2 in FIG. 11, the control circuit may receive a reprogramming instruction from the memory controller to reprogram the slow high-state memory cells. Responsive to receiving the reprogramming instruction, the control circuit may reprogram at least part of or all of the slow high-state memory cells using one or more program pulses from the $11^{th}$ program pulse to the $17^{th}$ program pulse.

Figure 12:
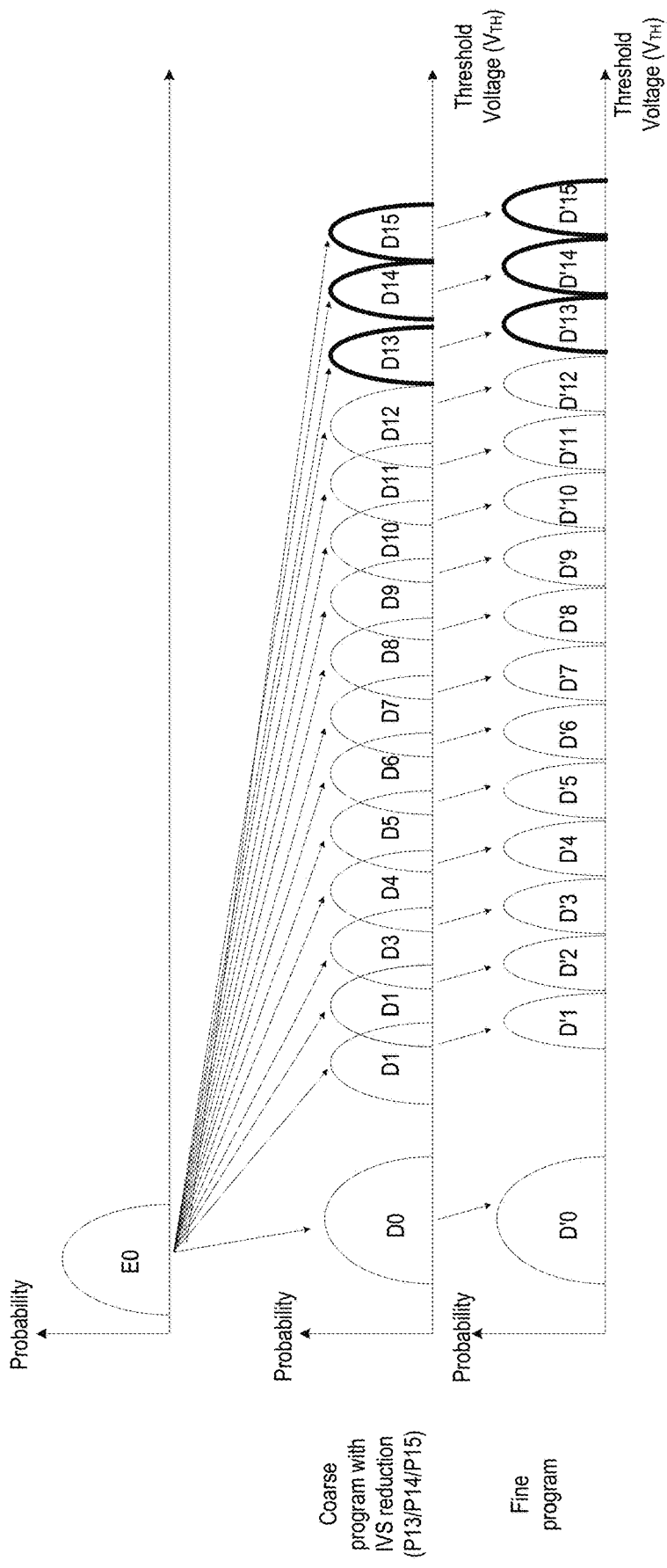
FIG. 12 illustrates a first example of threshold voltage distributions of memory cells in a multi-pass program operation, according to some aspects of the present disclosure.

FIG. 12 illustrates a first example of threshold voltage distributions of memory cells in a multi-pass program operation, according to some aspects of the present disclosure. The IVS reduction scheme disclosed with reference to FIG. 9 is applied during the programming of the memory cells. For example, for QLCs, the first predetermined programming state can be P13. A plurality of memory cells may include high-state memory cells configured to be programmed into programming states P13-P15 and non-high-state memory cells configured to be programmed into programming states P1-P12. A first program pass (e.g., a coarse program pass) may be performed on the high-state memory cells and the non-high-state memory cells. Further, the high-state memory cells may be continued to be programmed in the first program pass after the high-state memory cells pass their respective verification tests. Responsive to continuing to program the high-state memory cells, first widths of first threshold voltage distributions of the high-state memory cells corresponding to programming states P13-P15 are different from second widths of second threshold voltage distributions of the non-high-state memory cells. corresponding to the programming states P1-P12. For example, the first widths of first threshold voltage distributions of the high-state memory cells are narrower than the second widths of second threshold voltage distributions of the non-high-state memory cells. In FIG. 12, curves of the first threshold voltage distributions of the high-state memory cells corresponding to the programming states P13-P15 are illustrated with bold lines. D0 may represent the threshold voltage distribution of the erased state (E0). D1, D2, . . . , D15 may represent the threshold voltage distributions of the programming states P1, P2, . . . , P15, respectively.

Further, responsive to programming the high-state and non-high-state memory cells in a second program (e.g., a fine program pass), the first widths of first threshold voltage distributions of the high-state memory cells corresponding to the programming states P13-P15 are identical to (or substantially identical to) the second widths of the second threshold voltage distributions of the non-high-state memory cells corresponding to the programming states P1-P12. D' 0 may represent the threshold voltage distribution of the erased state (E0). D' 1, D'2, . . . , D'15 may represent the threshold voltage distributions of the programming states P1, P2, . . . , P15, respectively.

Figure 13:
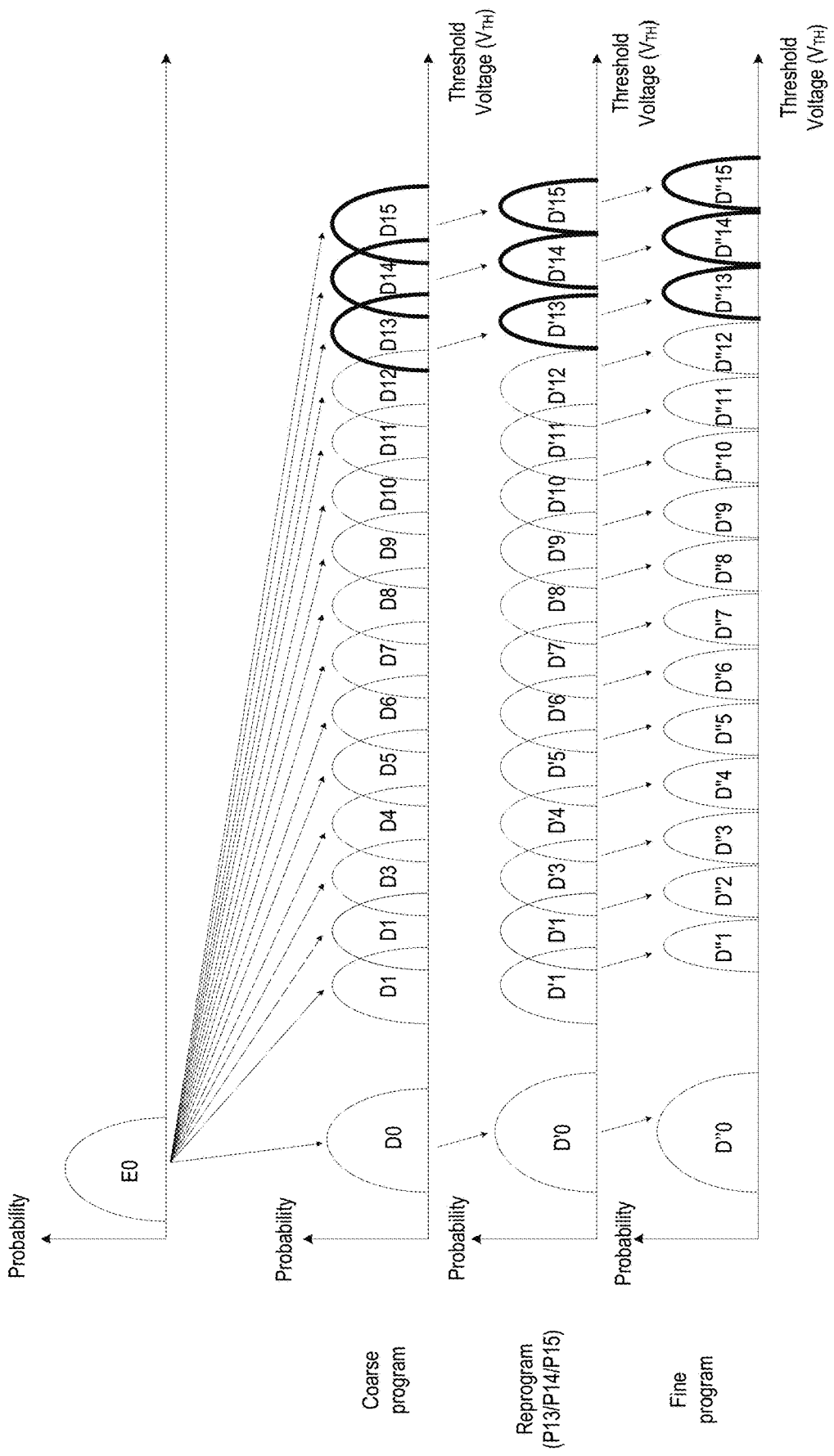
FIG. 13 illustrates a second example of threshold voltage distributions of memory cells in a multi-pass program operation, according to some aspects of the present disclosure.

FIG. 13 illustrates a second example of threshold voltage distributions of memory cells in a multi-pass program operation, according to some aspects of the present disclosure. The IVS reduction scheme described with reference to FIG. 10A or 10B can be applied. For example, for QLCs, the first predetermined programming state can be P13. A plurality of memory cells may include high-state memory cells configured to be programmed into programming states P13-P15 and non-high-state memory cells configured to be programmed into programming states P1-P12. A first program pass (e.g., a coarse program pass) may be performed on the high-state memory cells and the non-high-state memory cells. Responsive to programming the high-state and non-high-state memory cells in the first program pass, first widths of first threshold voltage distributions of the high-state memory cells corresponding to the programming states P13-P15 are identical to (or substantially identical to) second widths of second threshold voltage distributions of the non-high-state memory cells corresponding to the programming states P1-P12. D0 may represent the threshold voltage distribution of the erased state (E0). D1, D2, . . . , D15 may represent the threshold voltage distributions of the programming states P1, P2, . . . , P15, respectively. In FIG. 13, curves of the first threshold voltage distributions of memory cells corresponding to the programming states P13-P15 are illustrated with bold lines.

Next, the high-state memory cells can be reprogrammed in an intermediate program pass. Responsive to reprogramming the high-state memory cells in the intermediate program pass, the first widths of the first threshold voltage distributions of the high-state memory cells corresponding to the programming states P13-P15 are different from (e.g., narrower than) the second widths of the second threshold voltage distributions of the non-high-state memory cells corresponding to the programming states P1-P12. D'0 may represent the threshold voltage distribution of the erased state (E0). D'1, D'2, . . . , D'15 may represent the threshold voltage distributions of the programming states P1, P2, . . . , P15, respectively.

Subsequently, responsive to programming the high-state and non-high-state memory cells in a second program pass (e.g., a fine program pass), the first widths of the first threshold voltage distributions of the high-state memory cells corresponding to the programming states P13-P15 are identical to (or substantially identical to) the second widths of the second threshold voltage distributions of the non-high-state memory cells corresponding to the programming states P1-P12. D"0 may represent the threshold voltage distribution of the erased state (E0). D" 1, D"2, . . . , D"15 may represent the threshold voltage distributions of the programming states P1, P2, . . . , P15, respectively.

Figure 14B:
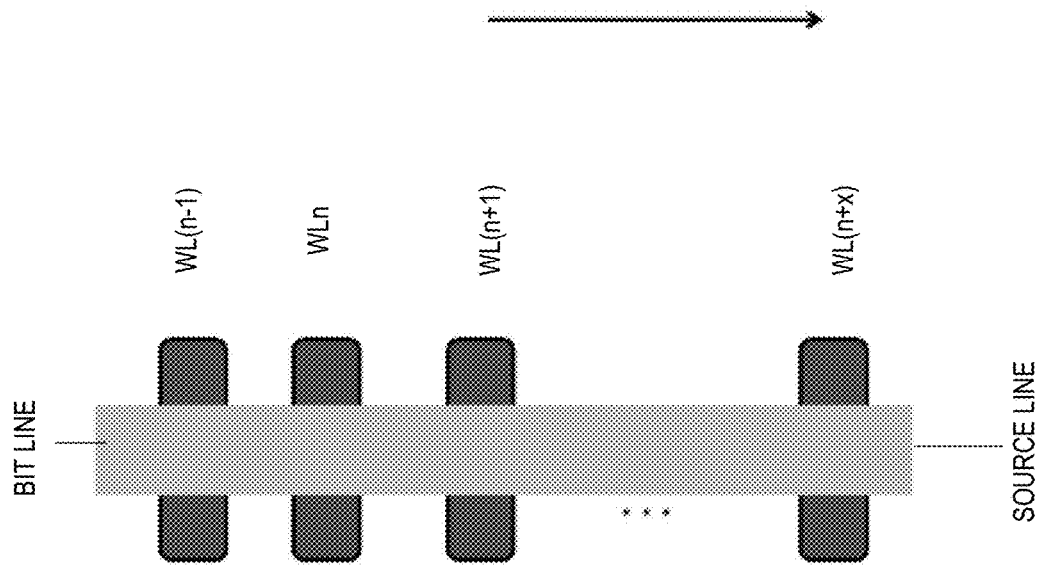
FIG. 14B illustrates another program order of memory cells coupled to different word lines, according to some aspects of the present disclosure.
Figure 14A:
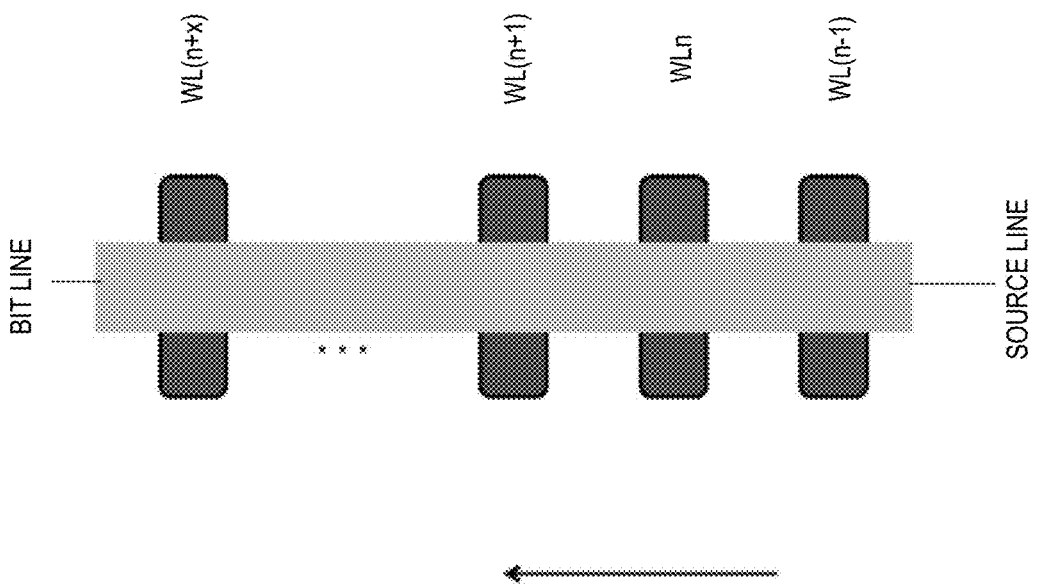
FIG. 14A illustrates a program order of memory cells coupled to different word lines, according to some aspects of the present disclosure.

FIG. 14A illustrates a program order of a memory string (e.g., including memory cells coupled to different word lines), according to some aspects of the present disclosure. The program order in FIG. 14A is from bottom to top. The bottom of the memory string is electrically coupled to a source line (e.g., source line 414 of FIG. 4) through a control transistor (e.g., transistor 410 of FIG. 4), and the top of the memory string is electrically coupled to a bit line (e.g., bit line 416 of FIG. 4) through a control transistor (e.g., transistor 412 of FIG. 4). For example, memory cells coupled to a word line WL(n−1) at the bottom are firstly programmed; next, memory cells coupled to a word line WL(n) are programmed; and subsequently, memory cells coupled to a word line WL(n+1) are programmed. Memory cells coupled to a word line WL(n+x) on the top are programmed at last.

FIG. 14B illustrates another program order of memory cells coupled to different word lines, according to some aspects of the present disclosure. The program order in FIG. 14B is from top to bottom. Like FIG. 14A, the bottom of the memory string is electrically coupled to a source line (e.g., source line 414 of FIG. 4) through a control transistor (e.g., transistor 410 of FIG. 4), and the top of the memory string is electrically coupled to a bit line (e.g., bit line 416 of FIG. 4) through a control transistor (e.g., transistor 412 of FIG. 4). For example, memory cells coupled to a word line WL(n−1) on the top are firstly programmed; next, memory cells coupled to a word line WL(n) are programmed; and subsequently, memory cells coupled to a word line WL(n+1) are programmed. Memory cells coupled to a word line WL(n+x) at the bottom are programmed at last.

Figure 15:
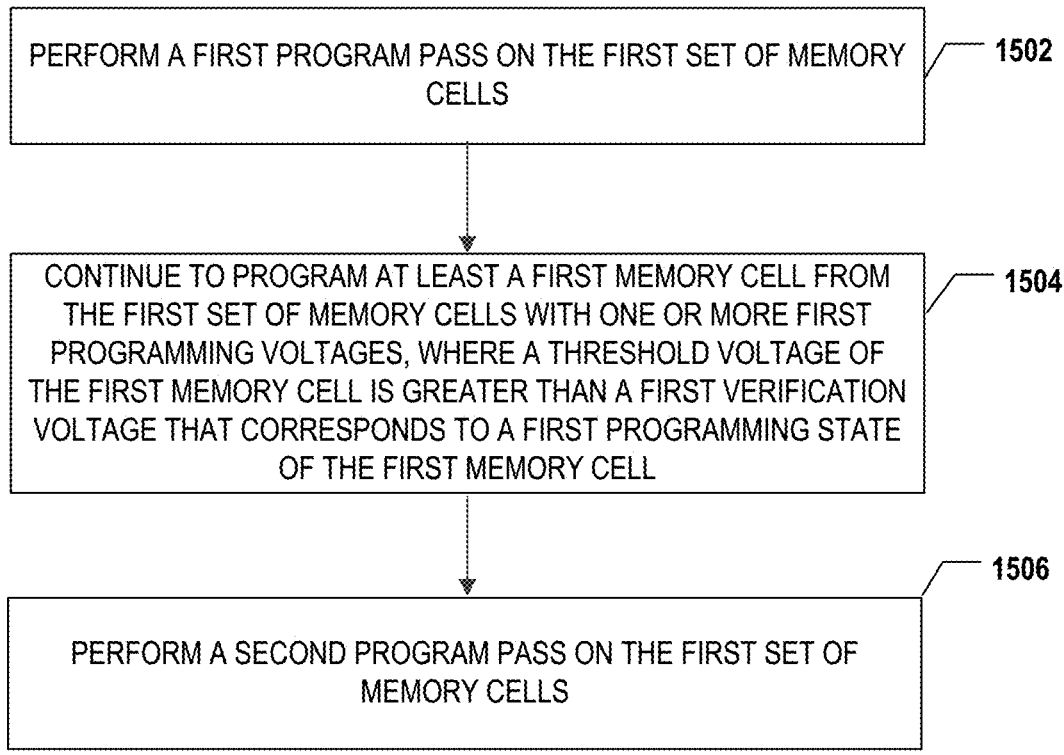
FIG. 15 illustrates a flowchart of a sixth method for operating a memory device, according to some aspects of the present disclosure.

FIG. 15 illustrates a flowchart of a sixth method 1500 for operating a memory device, according to some aspects of the present disclosure. The memory device may be any suitable memory device disclosed herein, such as memory system 100 or memory device 400. Method 1500 may be implemented by a control circuit, such as control circuit 110 or control logic 512. It is understood that the operations shown in method 1500 may not be exhaustive and that other operations can be performed as well before, after, or between any of the illustrated operations. Further, some of the operations may be performed simultaneously, or in a different order than shown in FIG. 15.

The memory device may include a plurality of memory cells. The plurality of memory cells may include a first set of memory cells configured to be programmed into a first set of programming states each of which is not lower than a first predetermined programming state.

Referring to FIG. 15, method 1500 starts at operation 1502, in which a first program pass is performed on the first set of memory cells.

Method 1500 proceeds to operation 1504, as illustrated in FIG. 15, in which at least a first memory cell from the first set of memory cells is continued to be programmed with one or more first programming voltages, where a threshold voltage of the first memory cell is greater than a first verification voltage that corresponds to a first programming state of the first memory cell. For example, the first memory cell can be any memory cell from the first set of memory cells. In another example, the first memory cell can be a slow high-state memory cell from the first set of memory cells.

Method 1500 proceeds to operation 1506, as illustrated in FIG. 15, in which a second program pass is performed on the first set of memory cells.

Consistent with some implementations of the present disclosure, the plurality of memory cells may also include a second set of memory cells configured to be programmed into a second set of programming states each of which is lower than the first predetermined programming state. The control circuit may be configured to: perform a first program pass on the first set of memory cells and the second set of memory cells; continue to program at least a first memory cell from the first set of memory cells with one or more first programming voltages, where a first width of a first threshold voltage distribution of the first memory cell is different from a second width of a second threshold voltage distribution of a second memory cell from the second set of memory cells; and perform a second program pass on the first set of memory cells and the second set of memory cells. For example, the first width of the first threshold voltage distribution of the first memory cell is narrower than the second width of the second threshold voltage distribution of the second memory cell from the second set of memory cells.

Figure 16:
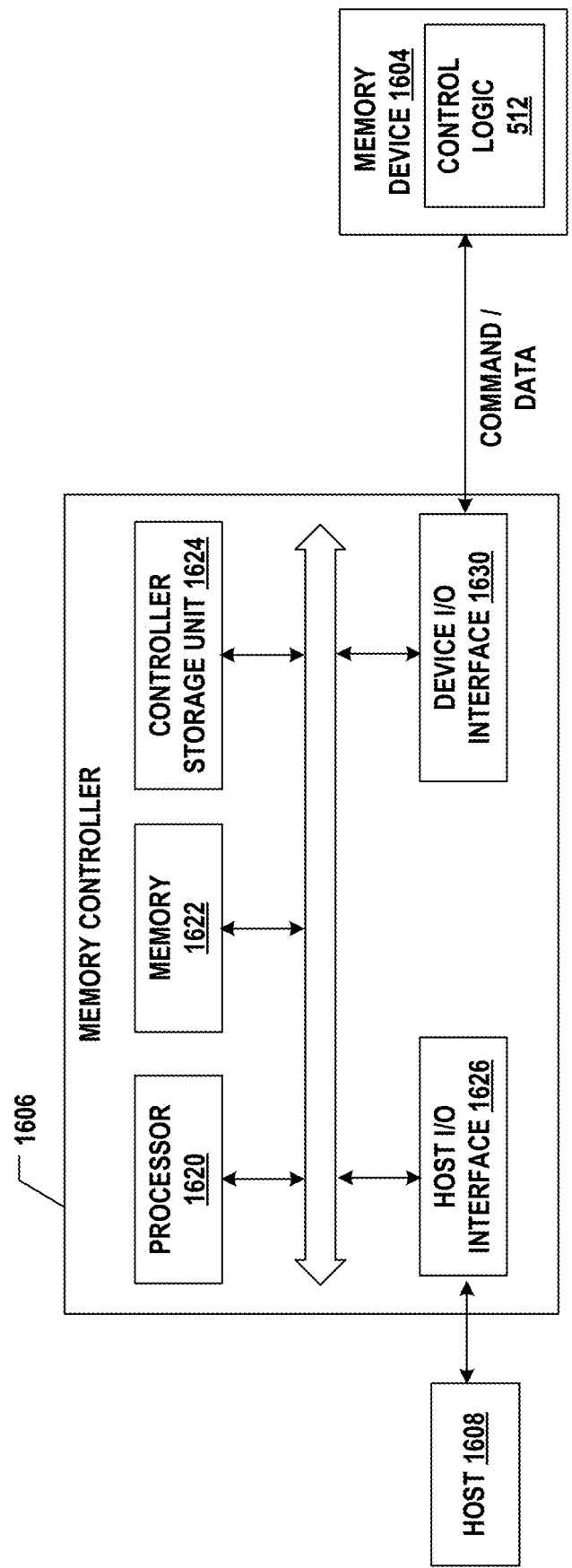
FIG. 16 illustrates a detailed block diagram of a structure of a memory controller, according to some aspects of the present disclosure.

FIG. 16 illustrates a detailed block diagram of a structure of a memory controller 1606, according to some aspects of the present disclosure. Memory controller 1606 may include at least one of a processor 1620, a memory 1622, a controller storage unit 1624, a host input/output (I/O) interface 1626, or a device I/O interface 1630.

Processor 1620 can be any suitable type of processors, for example, a central processing unit (CPU), a microprocessor, a system-on-chip (SoC), or an application processor (AP), etc. Processor 1620 may include various computing architectures including a complex instruction set computer (CISC) architecture, a reduced instruction set computer (RISC) architecture, or an architecture implementing a combination of instruction sets. Although only a single processor is shown in FIG. 16, multiple processors may be included. Processor 1620 can be configured to send or receive data to or from memory 1622. For example, processor 1620 can be configured to receive instructions from memory 1622 and execute the instructions to provide the functionality described herein.

Memory 1622 stores data that may include code or routines for performing part of or all of the techniques described herein. Memory 1622 may be a dynamic random access memory (DRAM) device, a static random access memory (SRAM) device, a hard disk drive, a floppy disk drive, a CD-ROM device, a DVD-ROM device, a DVD-RAM device, a DVD-RW device, a flash memory device (e.g., NAND Flash memory device), or some other suitable memory device.

Controller storage unit 1624 can be any suitable storage unit included in memory controller 1606. For example, controller storage unit 1624 may be a cache storage unit or a data storage unit. In another example, controller storage unit 1624 may be a latch or a flip-flop. In some implementations, controller storage unit 1624 may be configured to store program information associated with a program operation. Alternatively, the program information may be stored in memory 1622. Although a single controller storage unit is shown in FIG. 16, it is understood that memory controller 1606 may include a plurality of controller storage units.

Host I/O interface 1626 may be an interface that couples memory controller 1606 to host 1608. For example, host I/O interface 1626 may include one or more of a network interface, a universal serial bus (USB), a thunderbolt, or any other suitable type of interface capable of outputting or receiving data to or from host 1608. Similarly, device I/O interface 1630 may be an interface that couples memory controller 1606 to a memory device 1604. For example, device I/O interface 1630 may include any suitable type of interface capable of outputting or receiving data to or from memory device 1604.

In some implementations, a command (e.g., a program command, a read command, etc.) received from host 1608 can be sent to control logic 512 of memory device 1604 through device I/O interface 1630. In some implementations, data received from memory device 1604 can be sent to host 1608 through device I/O interface 1630 and host I/O interface 1626.

Figure 17:
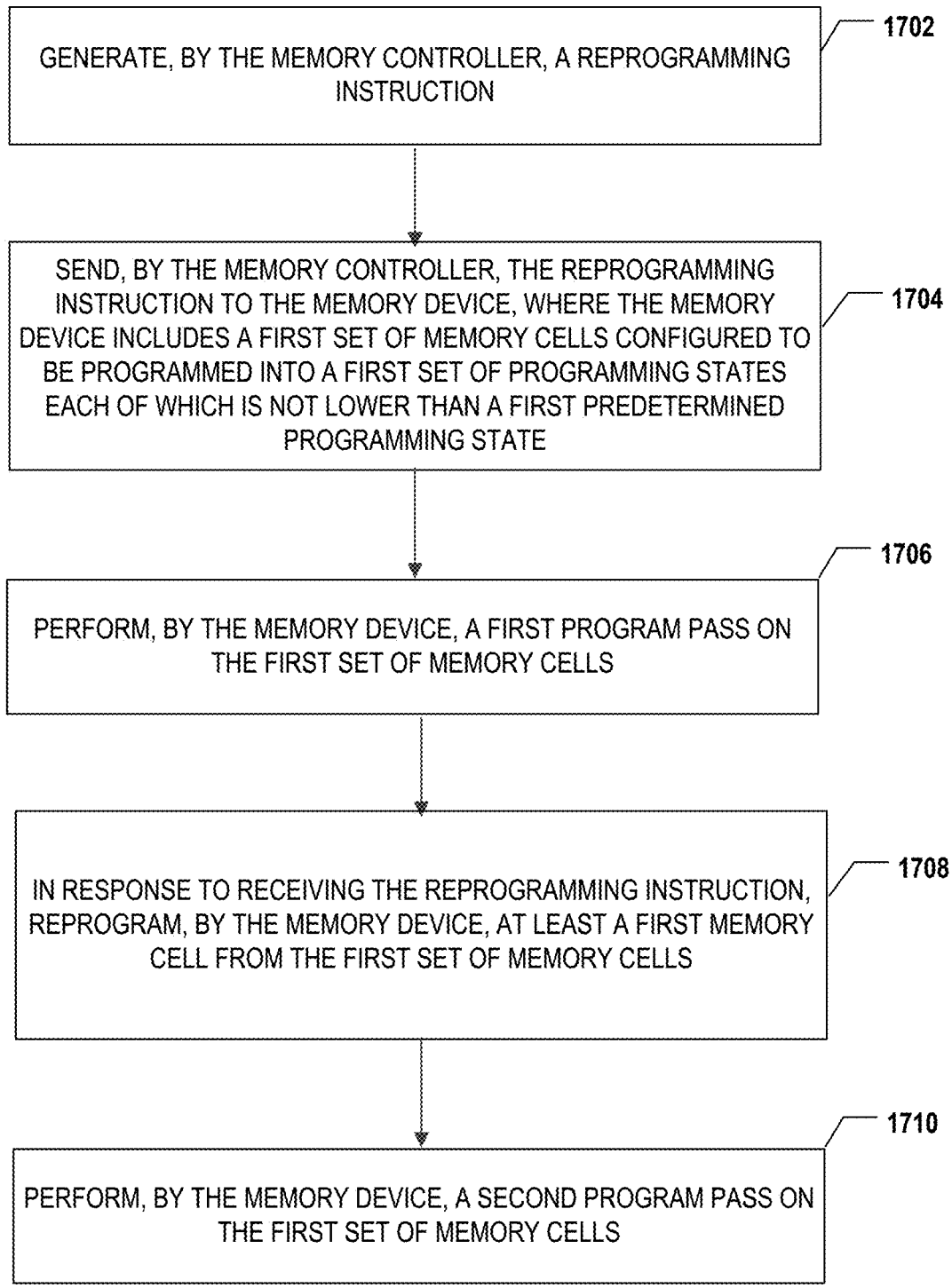
FIG. 17 illustrates a flowchart of a method for operating a system including a memory controller and a memory device, according to some aspects of the present disclosure.

FIG. 17 illustrates a flowchart of a method 1700 for operating a system including a memory controller and a memory device, according to some aspects of the present disclosure. The memory device may be any suitable memory device disclosed herein, such as memory system 100, memory device 400, or 1604. The memory controller can be any memory controller disclosed herein (e.g., memory controller 1606). It is understood that the operations shown in method 1700 may not be exhaustive and that other operations can be performed as well before, after, or between any of the illustrated operations. Further, some of the operations may be performed simultaneously, or in a different order than shown in FIG. 17.

Referring to FIG. 17, method 1700 starts at operation 1702, in which a reprogramming instruction is generated by the memory controller.

Method 1700 proceeds to operation 1704, as illustrated in FIG. 17, in which the reprogramming instruction is sent by the memory controller to the memory device, where the memory device includes a first set of memory cells configured to be programmed into a first set of programming states each of which is not lower than a first predetermined programming state.

Method 1700 proceeds to operation 1706, as illustrated in FIG. 17, in which a first program pass is performed by the memory device on the first set of memory cells.

Method 1700 proceeds to operation 1708, as illustrated in FIG. 17, in which in response to receiving the reprogramming instruction, at least a first memory cell from the first set of memory cells is reprogrammed by the memory device.

Method 1700 proceeds to operation 1710, as illustrated in FIG. 17, in which a second program pass is performed by the memory device on the first set of memory cells.

In some implementations, the memory controller is configured to generate and send the reprogramming instruction to the memory device prior to the second program pass performed on the first set of memory cells.

In some implementations, to reprogram at least the first memory cell from the first set of memory cells, the control circuit is configured to reprogram at least the first memory cell in an intermediate program pass prior to the second program pass performed on the first set of memory cells.

In some implementations, the first set of memory cells is coupled to a word line WL(n), where n is a positive integer. The plurality of memory cells further includes a second set of memory cells coupled to a word line WL(n+1), a third set of memory cells coupled to a word line WL(n+2), and a fourth set of memory cells coupled to a word line WL(n−1). The control circuit is further configured to: perform the first program pass on the first set of memory cells coupled to the word line WL(n); perform the second program pass on the fourth set of memory cells coupled to the word line WL(n−1); perform the first program pass on the second set of memory cells coupled to the word line WL(n+1); perform the second program pass on the first set of memory cells coupled to the word line WL(n); perform the first program pass on the third set of memory cells coupled to the word line WL(n+2); and perform the second program pass on the second set of memory cells coupled to the word line WL(n+1). The memory controller is configured to generate and send the reprogramming instruction to the memory device in response to one of the following: a completion of the first program pass performed on the first set of memory cells coupled to the word line WL(n), a completion of the second program pass performed on the fourth set of memory cells coupled to the word line WL(n−1), or a completion of the first program pass performed on the second set of memory cells coupled to the word line WL(n+1).

Figure 18:
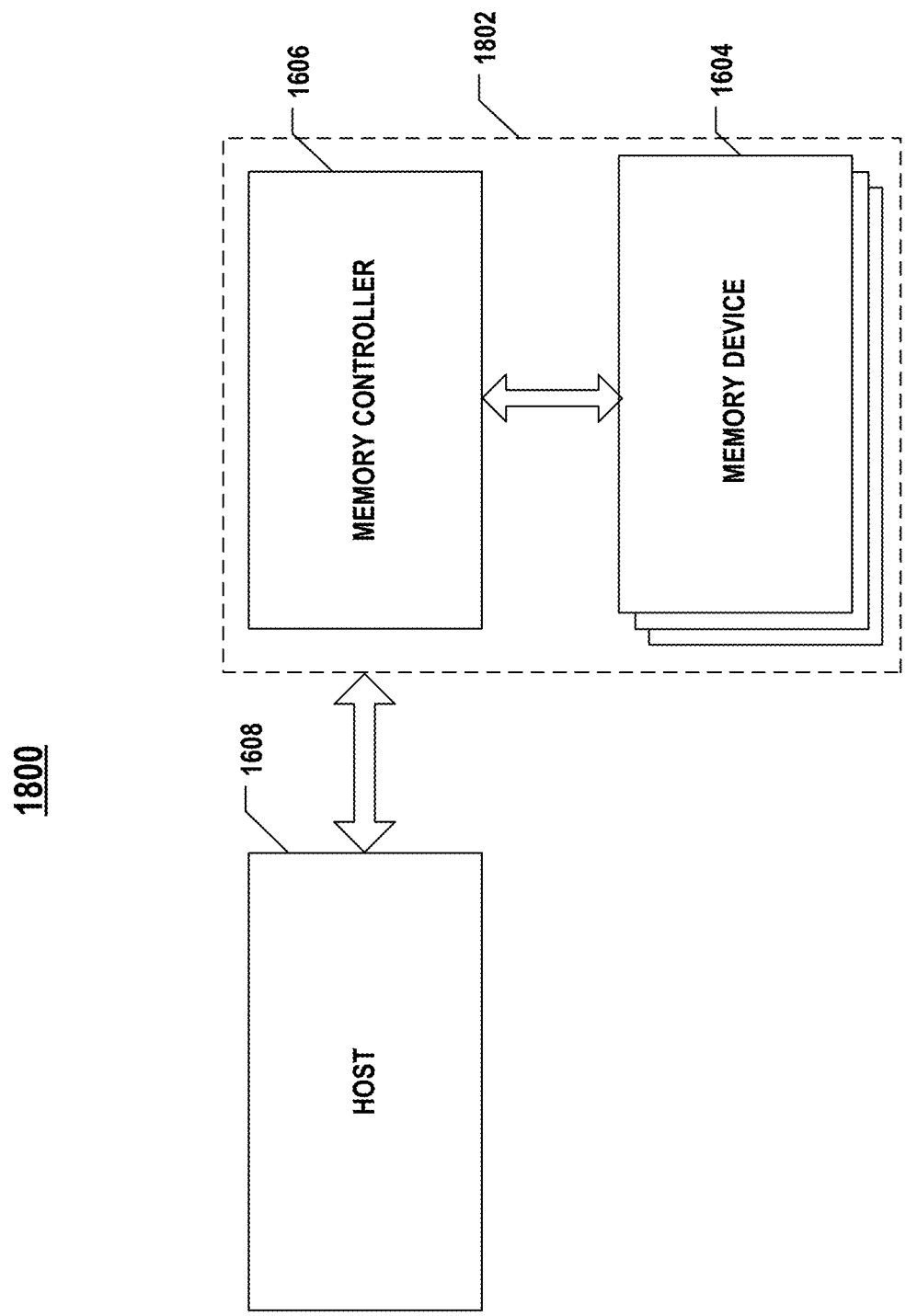
FIG. 18 illustrates a block diagram of a system having a memory device, according to some aspects of the present disclosure.

FIG. 18 illustrates a block diagram of a system 1800 having a memory device, according to some aspects of the present disclosure. System 1800 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 18, system 1800 can include a host (e.g., host 1608) and a memory system 1802 having one or more memory devices (e.g., memory device 1604) and a memory controller (e.g., memory controller 1606). Host 1608 can be a processor of an electronic device, such as a central processing unit (CPU), or a system-on-chip (SoC), such as an application processor (AP). Host 1608 can be configured to send or receive data to or from memory devices 1604. In order to send or receive data to or from memory devices 1604, host 1608 can send instructions to memory system 1802 besides the data.

Memory device 1604 can be any memory device disclosed in the present disclosure. For example, memory device 1604 can be a NAND Flash memory device, and can support the features and functionality disclosed herein. Memory device 1604 can include memory cells, for example, in NAND memory strings.

Memory controller 1606 is coupled to memory device 1604 and host 1608 and is configured to control memory device 1604, according to some implementations. Memory controller 1606 can manage the data stored in memory device 1604 and communicate with host 1608. In some implementations, memory controller 1606 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 1606 is designed for operating in a high duty-cycle environment SSDs or embedded multi-media-cards (eMMCs) used as data storage for mobile devices, such as smartphones, tablets, laptop computers, etc., and enterprise storage arrays. Memory controller 1606 can be configured to control operations of memory device 1604, such as read, erase, and program operations. For example, based on the instructions received from host 1608, memory controller 1606 may transmit various commands to memory device 1604, e.g., a program command, a read command, an erase command, etc., to control the operations of memory device 1604.

Memory controller 1606 can also be configured to manage various functions with respect to the data stored or to be stored in memory device 1604 including, but not limited to, bad-block management, garbage collection, logical-to-physical address conversion, wear leveling, etc. In some implementations, memory controller 1606 is further configured to process error correction codes (ECCs) with respect to the data read from or written to memory device 1604. Any other suitable functions may be performed by memory controller 1606 as well, for example, formatting memory device 1604. Memory controller 1606 can communicate with an external device (e.g., host 1608) according to a particular communication protocol. For example, memory controller 1606 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 19A:
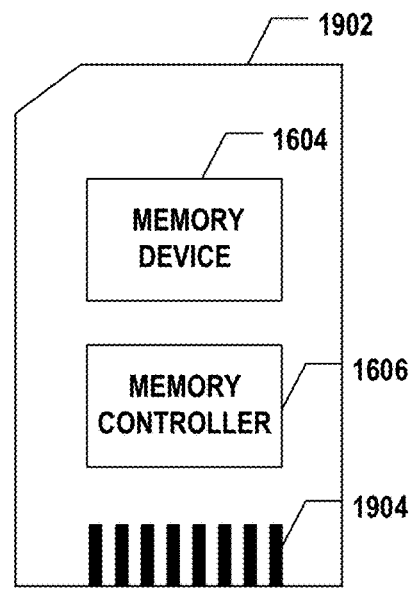
FIG. 19A illustrates a diagram of a memory card having a memory device, according to some aspects of the present disclosure.
Figure 19B:
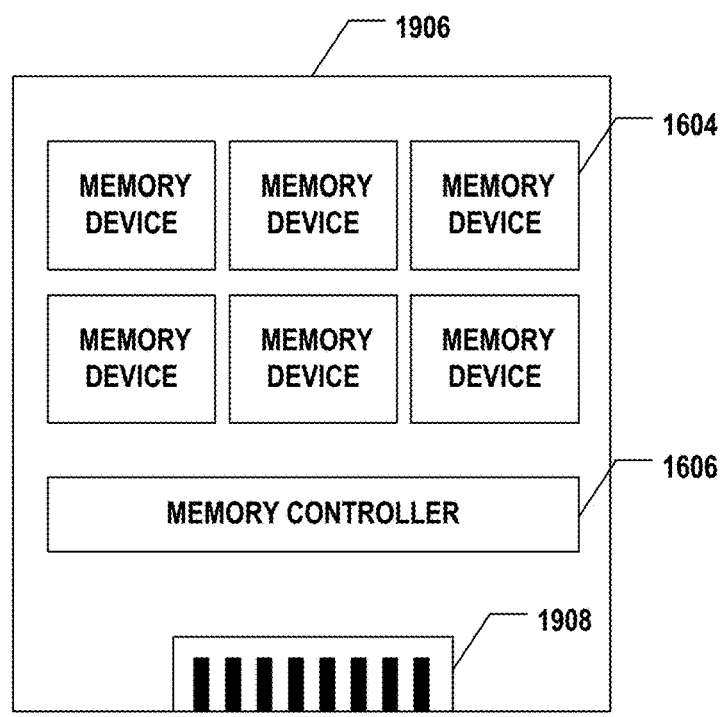
FIG. 19B illustrates a diagram of a solid-state drive (SSD) having a memory device, according to some aspects of the present disclosure.

Memory controller 1606 and one or more memory devices 1604 can be integrated into various types of storage devices, for example, be included in the same package, such as a universal Flash storage (UFS) package or an eMMC package. That is, memory system 1802 can be implemented and packaged into different types of end electronic products. In one example as shown in FIG. 19A, memory controller 1606 and a single memory device 1604 may be integrated into a memory card 1902. Memory card 1902 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 1902 can further include a memory card connector 1904 configured to couple memory card 1902 to a host (e.g., host 1608 in FIG. 16). In another example as shown in FIG. 19B, memory controller 1606 and multiple memory devices 1604 may be integrated into an SSD 1906. SSD 1906 can further include an SSD connector 1908 configured to couple SSD 1906 to a host. In some implementations, the storage capacity and/or the operation speed of SSD 1906 is greater than those of memory card 1902.

According to some aspects of the present disclosure, a memory device is disclosed. The memory device includes memory cells and a control circuit coupled to the memory cells. The control circuit is configured to program the memory cells, and reprogram at least a first memory cell of the memory cells. A threshold voltage of the first memory cell is greater than a verification voltage that corresponds to a first programming state not lower than a predetermined programming state after programming the memory cells.

In some implementations, the control circuit is configured to reprogram the first memory cell only once.

In some implementations, the threshold voltage of the first memory cell is not greater than the verification voltage before programming the memory cells.

In some implementations, the control circuit is configured to inhibit programming at least a second memory cell of the memory cells, where the threshold voltage of the second memory cell is greater than the verification voltage that corresponds to a second programming state lower than the predetermined programming state after programming the memory cells.

In some implementations, the control circuit is further configured to program at least a third memory cell of the memory cells, where the threshold voltage of the third memory cell is not greater than the verification voltage after programming the memory cells.

According to some aspects of the present disclosure, a memory device is disclosed. The memory device includes memory cells and a control circuit coupled to the memory cells. The control circuit is configured to program the memory cells. In response to determining that a predetermined number of program operations have been performed, the control circuit is configured to reprogram at least a first memory cell of the memory cells, where a threshold voltage of the first memory cell is greater than a verification voltage after programming the memory cells.

In some implementations, the control circuit is configured to reprogram the first memory cell only once.

In some implementations, the threshold voltage of the first memory cell is not greater than the verification voltage before programming the memory cells.

In some implementations, the control circuit is configured to inhibit programming at least a second memory cell of the memory cells, where the threshold voltage of the second memory cell is greater than the verification voltage after programming the memory cells.

In some implementations, the control circuit is further configured to program at least a third memory cell of the memory cells, where the threshold voltage of the third memory cell is not greater than the verification voltage after programming the memory cells.

According to some aspects of the present disclosure, a memory device is disclosed. The memory device includes memory cells and a control circuit coupled to the memory cells. The control circuit is configured to, in response to determining that a threshold voltage of at least a first memory cell of the memory cells corresponds to a first programming state not lower than a predetermined programming state, increase a first verification voltage to a second verification voltage.

In some implementations, the control circuit is further configured to, in response to determining that the threshold voltage of at least a second memory cell of the memory cells is greater than the second verification voltage, inhibit the second memory cell of the memory cells from programming.

According to some aspects of the present disclosure, a memory device is disclosed. The memory device includes memory cells and a control circuit coupled to the memory cells. The control circuit is configured to, in response to determining that a predetermined number of program operations have been performed, increase a first verification voltage to a second verification voltage.

In some implementations, the control circuit is further configured to, in response to determining that a threshold voltage of a second memory cell of the memory cells is greater than the second verification voltage, inhibit the second memory cell of the memory cells from programming.

According to some aspects of the present disclosure, a method of operating a memory device is disclosed. The method includes programming memory cells. The method further includes reprogramming at least a first memory cell of the memory cells, where a threshold voltage of the first memory cell is greater than a verification voltage that corresponds to a first programming state not lower than a predetermined programming state after programming the memory cells.

In some implementations, the first memory cell of the memory cells is reprogrammed only once.

In some implementations, the threshold voltage of the first memory cell is not greater than the verification voltage before programming the memory cells.

In some implementations, the method further includes inhibiting programming at least a second memory cell of the memory cells, where the threshold voltage of the second memory cell is greater than the verification voltage that corresponds to a second programming state lower than the predetermined programming state after programming the memory cells.

In some implementations, the method further includes programming at least a third memory cell of the memory cells, where the threshold voltage of the third memory cell is not greater than the verification voltage after programming the memory cells.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described implementations, but should be defined only in accordance with the following claims and their equivalents.

What is claimed is:

1. A memory device, comprising:
   a plurality of memory cells, comprising:
      a first set of memory cells configured to be programmed into a first set of programming states each of which is not lower than a first predetermined programming state; and
   a control circuit coupled to the plurality of memory cells and configured to:
      perform a first program pass to program the first set of memory cells;
      continue to program at least a first memory cell from the first set of memory cells with one or more first programming voltages, wherein a threshold voltage of the first memory cell is greater than a first verification voltage that corresponds to a first programming state of the first memory cell; and
      perform a second program pass to program the first set of memory cells after the first memory cell is continued to be programmed with the one or more first programming voltages.

2. The memory device of claim 1, wherein to continue to program at least the first memory cell with the one or more first programming voltages, the control circuit is configured to:
   apply the one or more first programming voltages to further program the first memory cell in the first program pass.

3. The memory device of claim 2, wherein:
   the threshold voltage of the first memory cell is smaller than the first verification voltage in a previous program loop of the first program pass, and becomes greater than the first verification voltage in a current program loop of the first program pass; and
   to apply the one or more first programming voltages to further program the first memory cell in the first program pass, the control circuit is configured to apply one or more program pulses in one or more following program loops after the current program loop to further program the first memory cell in the one or more following program loops, respectively.

4. The memory device of claim 1, wherein to continue to program at least the first memory cell from the first set of memory cells with the one or more first programming voltages, the control circuit is configured to:
   reprogram at least the first memory cell in an intermediate program pass between the first program pass and the second program pass performed on the first set of memory cells.

5. The memory device of claim 4, wherein the control circuit is further configured to reprogram at least the first memory cell in the intermediate program pass in response to receiving a reprogramming instruction from a memory controller.

6. The memory device of claim 1, wherein:
   the first set of memory cells is coupled to a word line WL(n), wherein n is a positive integer;
   the plurality of memory cells further comprise a second set of memory cells coupled to a word line WL(n+1), a third set of memory cells coupled to a word line WL(n+2), and a fourth set of memory cells coupled to a word line WL(n−1); and
   the control circuit is further configured to:
      perform the first program pass on the first set of memory cells coupled to the word line WL(n);
      perform the second program pass on the fourth set of memory cells coupled to the word line WL(n−1);
      perform the first program pass on the second set of memory cells coupled to the word line WL(n+1);
      perform the second program pass on the first set of memory cells coupled to the word line WL(n);
      perform the first program pass on the third set of memory cells coupled to the word line WL(n+2); and
      perform the second program pass on the second set of memory cells coupled to the word line WL(n+1).

7. The memory device of claim 6, wherein:
   the second set of memory cells is configured to be programmed into a second set of programming states each of which is not lower than the first predetermined programming state;
   the third set of memory cells is configured to be programmed into a third set of programming states each of which is not lower than the first predetermined programming state; and
   the control circuit is further configured to:
      continue to program at least the first memory cell from the first set of memory cells with the one or more first programming voltages in the first program pass performed on the first set of memory cells coupled to the word line WL(n);
      continue to program at least a second memory cell from the second set of memory cells with one or more second programming voltages in the first program pass performed on the second set of memory cells coupled to the word line WL(n+1); and
      continue to program at least a third memory cell from the third set of memory cells with one or more third programming voltages in the first program pass performed on the third set of memory cells coupled to the word line WL(n+2).

8. The memory device of claim 6, wherein:
   the second set of memory cells is configured to be programmed into a second set of programming states each of which is not lower than the first predetermined programming state;
   the third set of memory cells is configured to be programmed into a third set of programming states each of which is not lower than the first predetermined programming state; and
   the control circuit is further configured to:
      reprogram at least the first memory cell in an intermediate program pass between the first program pass and the second program pass performed on the first set of memory cells coupled to the word line WL(n);
      reprogram at least a second memory cell from the second set of memory cells in an intermediate program pass between the first program pass and the second program pass performed on the second set of memory cells coupled to the word line WL(n+1); and
      reprogram at least a third memory cell from the third set of memory cells in an intermediate program pass between the first program pass and the second program pass performed on the third set of memory cells coupled to the word line WL(n+2).

9. The memory device of claim 1, wherein responsive to programming at least the first memory cell from the first set of memory cells with the one or more first programming voltages, a first width of a first threshold voltage distribution of the first memory cell corresponding to the first programming state is different from a second width of a second threshold voltage distribution of a second memory cell corresponding to a second programming state, wherein the second programming state is lower than the first predetermined programming state.

10. The memory device of claim 1, wherein to continue to program at least the first memory cell with the one or more first programming voltages, the control circuit is configured to:
   determine that a predetermined number of program loops have been performed when the threshold voltage of the first memory cell becomes greater than the first verification voltage, wherein a value for the predetermined number of program loops is determined based on the first predetermined programming state; and
   select the first memory cell from the first set of memory cells to continue to program the first memory cell with the one or more first programming voltages.

11. The memory device of claim 1, wherein to continue to program the at least one first memory cell with the one or more first programming voltages, the control circuit is configured to:
   determine that a programming of a second predetermined programming state has been finished when the threshold voltage of the at least one first memory cell becomes greater than the first verification voltage, wherein the second predetermined programming state is determined based on the first predetermined programming state; and
   select the first memory cell from the first set of memory cells to continue to program the first memory cell with the one or more first programming voltages.

12. The memory device of claim 1, wherein the plurality of memory cells are quad-level cells (QLCs), and the first and second program passes comprise a coarse program pass and a fine program pass, respectively.

13. A system, comprising:
   a memory controller configured to generate and send a reprogramming instruction to a memory device;
   the memory device coupled to the memory controller and configured to store data, comprising:
      a plurality of memory cells, comprising a first set of memory cells configured to be programmed into a first set of programming states each of which is not lower than a first predetermined programming state; and
      a control circuit coupled to the plurality of memory cells and configured to:
         perform a first program pass to program the first set of memory cells;
         in response to receiving the reprogramming instruction, reprogram at least a first memory cell from the first set of memory cells; and
         perform a second program pass to program the first set of memory cells after the first memory cell is reprogrammed.

14. The system of claim 13, wherein the memory controller is configured to generate and send the reprogramming instruction to the memory device prior to the second program pass performed on the first set of memory cells.

15. The system of claim 14, wherein to reprogram at least the first memory cell from the first set of memory cells, the control circuit is configured to:
   reprogram at least the first memory cell in an intermediate program pass prior to the second program pass performed on the first set of memory cells.

16. The system of claim 14, wherein:
   the first set of memory cells is coupled to a word line WL(n), wherein n is a positive integer;
   the plurality of memory cells further comprise a second set of memory cells coupled to a word line WL(n+1), a third set of memory cells coupled to a word line WL(n+2), and a fourth set of memory cells coupled to a word line WL(n−1); and
   the control circuit is further configured to:
      perform the first program pass on the first set of memory cells coupled to the word line WL(n);
      perform the second program pass on the fourth set of memory cells coupled to the word line WL(n−1);
      perform the first program pass on the second set of memory cells coupled to the word line WL(n+1);
      perform the second program pass on the first set of memory cells coupled to the word line WL(n);
      perform the first program pass on the third set of memory cells coupled to the word line WL(n+2); and
      perform the second program pass on the second set of memory cells coupled to the word line WL(n+1).

17. The system of claim 16, wherein the memory controller is configured to generate and send the reprogramming instruction to the memory device in response to one of the following: a completion of the first program pass performed on the first set of memory cells coupled to the word line WL(n), a completion of the second program pass performed on the fourth set of memory cells coupled to the word line WL(n−1), or a completion of the first program pass performed on the second set of memory cells coupled to the word line WL(n+1).

18. A method for operating a memory device comprising a plurality of memory cells, the plurality of memory cells comprising a first set of memory cells configured to be programmed into a first set of programming states each of which is not lower than a first predetermined programming state, the method comprising:
   performing a first program pass to program the first set of memory cells;
   continuing to program at least a first memory cell from the first set of memory cells with one or more first programming voltages, wherein a threshold voltage of the first memory cell is greater than a first verification voltage that corresponds to a first programming state of the first memory cell; and
   performing a second program pass to program the first set of memory cells after the first memory cell is continued to be programmed with the one or more first programming voltages.

19. A method for operating a system comprising a memory controller and a memory device, comprising:
   generating, by the memory controller, a reprogramming instruction;
   sending, by the memory controller, the reprogramming instruction to the memory device, wherein the memory device comprises a first set of memory cells configured to be programmed into a first set of programming states each of which is not lower than a first predetermined programming state;
   performing, by the memory device, a first program pass to program the first set of memory cells;
   in response to receiving the reprogramming instruction, reprogramming, by the memory device, at least a first memory cell from the first set of memory cells; and
   performing, by the memory device, a second program pass to program the first set of memory cells after the first memory cell is reprogrammed.

20. A memory device, comprising:
a plurality of memory cells, comprising:
- a first set of memory cells configured to be programmed into a first set of programming states each of which is not lower than a first predetermined programming state; and
- a second set of memory cells configured to be programmed into a second set of programming states each of which is lower than the first predetermined programming state; and a control circuit coupled to the plurality of memory cells and configured to:
- perform a first program pass to program the first set of memory cells and the second set of memory cells;
- continue to program at least a first memory cell from the first set of memory cells with one or more first programming voltages, wherein a first width of a first threshold voltage distribution of the first memory cell is different from a second width of a second threshold voltage distribution of a second memory cell from the second set of memory cells; and
- perform a second program pass to program the first set of memory cells and the second set of memory cells after the first memory cell is continued to be programmed with the one or more first programming voltages.

21. The memory device of claim 20, wherein the first width of the first threshold voltage distribution of the first memory cell is narrower than the second width of the second threshold voltage distribution of the second memory cell from the second set of memory cells.

* * * * *